(12) United States Patent
Lin et al.

(10) Patent No.: US 8,891,794 B1
(45) Date of Patent: Nov. 18, 2014

(54) METHODS AND DEVICES FOR CREATING AND MODIFYING SOUND PROFILES FOR AUDIO REPRODUCTION DEVICES

(71) Applicant: Alpine Electronics of Silicon Valley, Inc., Santa Clara, CA (US)

(72) Inventors: Rocky Chau-Hsiung Lin, Cupertino, CA (US); Thomas Yamasaki, Anaheim Hills, CA (US); Hiroyuki Toki, San Jose, CA (US); Koichiro Kanda, San Jose, CA (US)

(73) Assignee: Alpine Electronics of Silicon Valley, Inc., Santa Clara, CA (US)

( * ) Notice: Subject to any disclaimer, the term of this patent is extended or adjusted under 35 U.S.C. 154(b) by 0 days.

(21) Appl. No.: 14/269,009

(22) Filed: May 2, 2014

Related U.S. Application Data

(63) Continuation of application No. 14/181,512, filed on Feb. 14, 2014, now Pat. No. 8,767,996.

(60) Provisional application No. 61/924,148, filed on Jan. 6, 2014.

(51) Int. Cl.
*H04R 25/00* (2006.01)
*H04R 3/12* (2006.01)

(52) U.S. Cl.
CPC ...................................... *H04R 3/12* (2013.01)
USPC ........................................... 381/315; 381/313

(58) Field of Classification Search
CPC .... G06Q 30/02; H04R 5/04; H04R 2205/024; H04R 2205/041
USPC ...................... 381/312–316, 60, 320; 700/94; 709/205–207; 455/556.1
See application file for complete search history.

(56) References Cited

U.S. PATENT DOCUMENTS

| | | | |
|---|---|---|---|
| 1,969,559 | A | 8/1934 | Kelly |
| 2,151,706 | A | 3/1939 | Lieber |

(Continued)

FOREIGN PATENT DOCUMENTS

| | | | |
|---|---|---|---|
| AU | 52098/96 B | 1/1997 |
| CN | 101310557 A | 11/2008 |

(Continued)

OTHER PUBLICATIONS

Braida et al., "Review of Recent Research on Multiband Amplitude Compression for the Hearing Impaired," Research Laboratory of Electronics, Massachusetts Institute of Technology, 133-140, 1982.

(Continued)

*Primary Examiner* — Simon Sing
*Assistant Examiner* — Eugene Zhao
(74) *Attorney, Agent, or Firm* — Perkins Coie LLP; Thomas N. Millikan; Joseph P. Reid

(57) ABSTRACT

Method and devices for processing audio signals based on sound profiles are provided. A reproduction device can request a sound profile based on user information, device information, media metadata or a combination. The sound profiles can be customized and shared across multiple devices. User interfaces allow for the input of information that allows the reproduction device or a server in the cloud to select, modify, store, and analyze sound profiles. Deeper analysis allows for the improvement of sound profiles for individuals and groups. Intensity scoring of a music library can also be conducted.

18 Claims, 18 Drawing Sheets

(56) References Cited

U.S. PATENT DOCUMENTS

| | | |
|---|---|---|
| 2,249,572 A | 7/1941 | Lieber |
| 2,681,389 A | 6/1954 | Shaper |
| 2,930,858 A | 3/1960 | Hollingsworth |
| 3,125,646 A | 3/1964 | Lewis |
| 3,134,861 A | 5/1964 | Dempsey et al. |
| 3,571,529 A | 3/1971 | Gharib et al. |
| 3,586,425 A | 6/1971 | Gilman |
| 3,600,068 A | 8/1971 | Jolicoeur, Jr. et al. |
| 3,604,861 A | 9/1971 | Lewis et al. |
| 3,718,763 A | 2/1973 | Cannon et al. |
| 3,764,745 A | 10/1973 | Bottcher et al. |
| 3,808,354 A | 4/1974 | Feezor et al. |
| 3,894,195 A | 7/1975 | Kryter |
| 3,962,543 A | 6/1976 | Blauert et al. |
| 3,980,842 A | 9/1976 | Weisbrich |
| 3,989,904 A | 11/1976 | Rohrer et al. |
| 4,006,318 A | 2/1977 | Sebesta et al. |
| 4,039,750 A | 8/1977 | Hull |
| 4,051,331 A | 9/1977 | Strong et al. |
| 4,110,583 A | 8/1978 | Lepper |
| 4,173,715 A | 11/1979 | Gosman |
| 4,201,225 A | 5/1980 | Bethea, III et al. |
| 4,284,847 A | 8/1981 | Besserman |
| 4,289,935 A | 9/1981 | Zollner et al. |
| 4,309,575 A | 1/1982 | Zweig et al. |
| 4,425,481 A | 1/1984 | Mansgold et al. |
| 4,471,171 A | 9/1984 | Kopke et al. |
| 4,548,082 A | 10/1985 | Engebretson et al. |
| 4,591,668 A | 5/1986 | Iwata |
| 4,622,440 A | 11/1986 | Slavin |
| 4,677,679 A | 6/1987 | Killion |
| 4,731,850 A | 3/1988 | Levitt et al. |
| 4,791,672 A | 12/1988 | Nunley et al. |
| 4,821,323 A | 4/1989 | Papiernik |
| 4,868,880 A | 9/1989 | Bennett, Jr. |
| 4,879,749 A | 11/1989 | Levitt et al. |
| 4,887,299 A | 12/1989 | Cummins et al. |
| 4,901,355 A | 2/1990 | Moore |
| 4,926,139 A | 5/1990 | Anderson et al. |
| 4,972,468 A | 11/1990 | Murase et al. |
| 5,027,410 A | 6/1991 | Williamson et al. |
| 5,046,102 A | 9/1991 | Zwicker et al. |
| 5,054,079 A | 10/1991 | Frielingsdorf et al. |
| 5,086,464 A | 2/1992 | Groppe |
| 5,146,501 A | 9/1992 | Spector |
| 5,164,987 A | 11/1992 | Raven |
| 5,195,132 A | 3/1993 | Bowker et al. |
| 5,197,332 A | 3/1993 | Shennib |
| 5,323,468 A | 6/1994 | Bottesch |
| 5,333,195 A | 7/1994 | Bowker et al. |
| 5,335,285 A | 8/1994 | Gluz |
| 5,355,418 A | 10/1994 | Kelsey et al. |
| 5,371,799 A | 12/1994 | Lowe et al. |
| 5,388,185 A | 2/1995 | Terry et al. |
| 5,406,633 A | 4/1995 | Miller et al. |
| 5,406,635 A | 4/1995 | Jarvinen |
| 5,438,626 A | 8/1995 | Neuman et al. |
| 5,452,359 A | 9/1995 | Inanaga et al. |
| RE35,051 E | 10/1995 | Moore |
| 5,457,751 A | 10/1995 | Such |
| 5,485,515 A | 1/1996 | Allen et al. |
| 5,495,534 A | 2/1996 | Inanaga et al. |
| 5,500,902 A | 3/1996 | Stockham, Jr. et al. |
| 5,506,911 A | 4/1996 | Neuman et al. |
| 5,521,919 A | 5/1996 | Anderson et al. |
| 5,524,148 A | 6/1996 | Allen et al. |
| 5,526,423 A | 6/1996 | Ohuchi et al. |
| 5,539,806 A | 7/1996 | Allen et al. |
| 5,590,213 A | 12/1996 | Urella et al. |
| 5,592,545 A | 1/1997 | Ho et al. |
| 5,596,507 A | 1/1997 | Jones et al. |
| 5,608,803 A | 3/1997 | Magotra et al. |
| 5,615,270 A | 3/1997 | Miller et al. |
| 5,630,159 A | 5/1997 | Zancho |
| 5,638,438 A | 6/1997 | Keen |
| 5,642,426 A | 6/1997 | Neuman et al. |
| 5,663,727 A | 9/1997 | Vokac |
| 5,706,352 A | 1/1998 | Engebretson et al. |
| 5,715,323 A | 2/1998 | Walker |
| 5,717,767 A | 2/1998 | Inanaga et al. |
| 5,721,783 A | 2/1998 | Anderson |
| 5,737,389 A | 4/1998 | Allen |
| 5,737,719 A | 4/1998 | Terry |
| 5,794,201 A | 8/1998 | Nejime et al. |
| 5,802,164 A | 9/1998 | Clancy et al. |
| 5,811,681 A | 9/1998 | Braun et al. |
| 5,848,171 A | 12/1998 | Stockham, Jr. et al. |
| 5,854,843 A | 12/1998 | Jacknin et al. |
| 5,854,978 A | 12/1998 | Heidari |
| 5,867,457 A | 2/1999 | Parvulescu et al. |
| 5,867,582 A | 2/1999 | Nagayoshi |
| 5,868,683 A | 2/1999 | Protopapas et al. |
| 5,890,124 A | 3/1999 | Galbi |
| 5,892,836 A | 4/1999 | Ishige et al. |
| 5,896,449 A | 4/1999 | Oshidari et al. |
| 5,903,076 A | 5/1999 | Suyama |
| 5,903,655 A | 5/1999 | Salmi et al. |
| 5,907,823 A | 5/1999 | Sjoberg et al. |
| 5,910,990 A | 6/1999 | Jang |
| 5,923,764 A | 7/1999 | Shennib |
| 5,928,160 A | 7/1999 | Clark et al. |
| 5,930,758 A | 7/1999 | Nishiguchi et al. |
| 5,943,413 A | 8/1999 | Ash et al. |
| 5,956,674 A | 9/1999 | Smyth et al. |
| 5,974,380 A | 10/1999 | Smyth et al. |
| 5,978,762 A | 11/1999 | Smyth et al. |
| 5,986,813 A | 11/1999 | Saikawa et al. |
| 5,987,418 A | 11/1999 | Gentit |
| 6,022,315 A | 2/2000 | Iliff |
| 6,029,126 A | 2/2000 | Malvar |
| 6,036,496 A | 3/2000 | Miller et al. |
| 6,055,502 A | 4/2000 | Kitamura |
| 6,061,431 A | 5/2000 | Knappe et al. |
| 6,072,885 A | 6/2000 | Stockham, Jr. et al. |
| 6,078,675 A | 6/2000 | Bowen-Nielsen et al. |
| 6,084,975 A | 7/2000 | Perkins |
| 6,094,481 A | 7/2000 | Deville et al. |
| 6,098,039 A | 8/2000 | Nishida |
| 6,104,822 A | 8/2000 | Melanson et al. |
| 6,141,427 A | 10/2000 | Fukuda |
| 6,212,496 B1 | 4/2001 | Campbell et al. |
| 6,233,345 B1 | 5/2001 | Urwyler |
| 6,298,249 B1 | 10/2001 | Locarno et al. |
| 6,322,521 B1 | 11/2001 | Hou |
| 6,433,801 B1 | 8/2002 | Moon et al. |
| 6,463,128 B1 | 10/2002 | Elwin |
| 6,483,925 B1 | 11/2002 | Shen et al. |
| 6,603,863 B1 | 8/2003 | Nagayoshi |
| 6,674,867 B2 | 1/2004 | Basseas |
| 6,684,063 B2 | 1/2004 | Berger et al. |
| 6,694,143 B1 | 2/2004 | Beamish et al. |
| 6,792,122 B1 | 9/2004 | Okada et al. |
| 6,913,578 B2 | 7/2005 | Hou |
| 6,944,309 B2 | 9/2005 | Terai et al. |
| 7,110,743 B2 | 9/2006 | Depew et al. |
| 7,123,737 B2 | 10/2006 | Ham |
| 7,181,297 B1 | 2/2007 | Pluvinage et al. |
| 7,324,655 B2 | 1/2008 | Sato |
| 7,848,512 B2 | 12/2010 | Eldracher |
| 7,983,437 B2 | 7/2011 | Wong et al. |
| 8,139,803 B2 | 3/2012 | Afshar |
| 8,175,302 B2 | 5/2012 | Tanghe et al. |
| 8,175,316 B2 | 5/2012 | Yamagishi et al. |
| 8,213,632 B2 | 7/2012 | Yamagishi et al. |
| 8,411,893 B2 | 4/2013 | Ito et al. |
| 8,433,580 B2 | 4/2013 | Sugiyama et al. |
| 8,473,099 B2 | 6/2013 | Sugiyama et al. |
| 8,538,059 B2 | 9/2013 | Yamagishi et al. |
| 2002/0068986 A1 | 6/2002 | Mouline |
| 2003/0128859 A1 | 7/2003 | Greene et al. |
| 2003/0165247 A1 | 9/2003 | Bantz et al. |
| 2006/0095516 A1* | 5/2006 | Wijeratne .................. 709/205 |
| 2006/0171553 A1 | 8/2006 | Wong et al. |
| 2007/0038164 A1 | 2/2007 | Afshar |

(56) References Cited

U.S. PATENT DOCUMENTS

| | | |
|---|---|---|
| 2007/0081529 A1 | 4/2007 | Sugiyama et al. |
| 2008/0112581 A1 | 5/2008 | Kim et al. |
| 2008/0318597 A1* | 12/2008 | Berns et al. ............... 455/456.5 |
| 2009/0185699 A1 | 7/2009 | Kim |
| 2010/0278359 A1 | 11/2010 | Rostami |
| 2011/0170702 A1 | 7/2011 | Bays |
| 2012/0035513 A1 | 2/2012 | Afshar |
| 2013/0218942 A1* | 8/2013 | Willis et al. .................. 709/201 |
| 2014/0073486 A1* | 3/2014 | Ahmed et al. .................... 482/9 |

FOREIGN PATENT DOCUMENTS

| | | |
|---|---|---|
| DE | 19600234 A1 | 7/1997 |
| DE | 29905172 U1 | 6/1999 |
| DE | 19815373 A1 | 10/1999 |
| EP | 0329383 A2 | 8/1989 |
| EP | 1931170 A2 | 6/2008 |
| EP | 2302953 A2 | 3/2011 |
| JP | H11133998 A | 5/1999 |
| JP | 2000236280 A | 8/2000 |
| WO | 9506996 A1 | 3/1995 |
| WO | 9805150 A1 | 2/1998 |
| WO | 9847314 A2 | 10/1998 |
| WO | 9851124 A2 | 11/1998 |
| WO | 9851126 A1 | 11/1998 |
| WO | 9914986 A1 | 3/1999 |
| WO | 9931937 A1 | 6/1999 |
| WO | 0064350 A1 | 11/2000 |
| WO | 0152737 A1 | 7/2001 |

OTHER PUBLICATIONS

Lippmann, et al., "Study of Multichannel Amplitude Compression and Linear Amplification for Persons with Sensorineural Hearing Loss," Acoustical Society of America Feb. 69(2):524-534, 1981.

Sony Online World, Memory Stick, The Concept, http://www.world.sony.com/Electronics/MS/concept/exp2.html, Oct. 11, 1999.

Unser, et al., "B-Spline Signal Processing: Part II-Efficient Design and Applications," IEEE Transactions on Signal Processing, 41(2):834-848, 1993.

U.S. Provisional Appl. No, 60/177,695, filed Jan. 24, 2000 entitled "Remote Hearing Test," inventor Zezhang Hou.

U.S. Provisional Appl. No. 60/189,010, filed Mar. 13, 2000 entitled "Method and System for On-Line Hearing Examination and Correction," inventor Zezhang Hou Li.

Vilichur, T al., "Signal Processing to Improve Speech Intelligibility in Perceptive Deafness," The Journal of the Acoustical Society of America, 53(6):1646-1657, 1973.

Wireless Short Message Service (SMS) TeleCommunication Systems Web ProForum Tutorials, pp. 1-18.

* cited by examiner

METHODS AND DEVICES FOR CREATING AND MODIFYING SOUND PROFILES FOR AUDIO REPRODUCTION DEVICES

CROSS REFERENCE TO RELATED APPLICATIONS

This application claims priority to U.S. Provisional Application 61/924,148, filed on Jan. 6, 2014, entitled "Method and Devices for Reproducing Audio Signals with a Haptic Apparatus on Acoustic Headphones," and application Ser. No. 14/181,512, filed on Feb. 14, 2014, entitled "Methods and Devices for Reproducing Audio Signals with a Haptic Apparatus on Acoustic Headphones," both of which are incorporated by reference herein in their entirety.

TECHNICAL FIELD

The present invention is directed to improving the auditory experience by modifying sound profiles based on individualized user settings, or matched to a specific song, artist, genre, geography, demography, or consumption modality.

BACKGROUND

Consumers of media containing audio—whether it be music, movies, videogames, or other media—seek an immersive audio experience. To achieve and optimize that experience, the sound profiles associated with the audio signals may need to be modified to account for a range of preferences and situations. For example, different genres of music, movies, and games typically have their own idiosyncratic sound that may be enhanced through techniques emphasizing or deemphasizing portions of the audio data. Listeners living in different geographies or belonging to different demographic classes may have preferences regarding the way audio is reproduced. The surroundings in which audio reproduction is accomplished—ranging from headphones worn on the ears, to inside cars or other vehicles, to interior and exterior spaces—may necessitate modifications in sound profiles. And, individual consumers may have their own, personal preferences.

SUMMARY

The present inventors recognized the need to modify, store, and share the sound profile of audio data to match a reproduction device, user, song, artist, genre, geography, demography or consumption location.

Various implementations of the subject matter described herein may provide one or more of the following advantages. In one or more implementations, the techniques and apparatus described herein can enhance the auditory experience. By allowing such modifications to be stored and shared across devices, various implementations of the subject matter herein allow those enhancements to be applied in a variety of reproduction scenarios and consumption locations, and/or shared between multiple consumers. Collection and storage of such preferences and usage scenarios can allow for further analysis in order to provide further auditory experience enhancements.

In general, in one aspect, the techniques can be implemented to include a memory capable of storing audio data; a transmitter capable of transmitting device information and audio metadata related to the audio data over a network; a receiver capable of receiving a sound profile, wherein the sound profile contains parameters for modifying the audio data; and a processor capable of modifying the audio data according to the parameters in the sound profile. Further, the techniques can be implemented to include an user interface capable of allowing a user to change the parameters contained within the sound profile. Further, the techniques can be implemented such that the memory is capable of storing the changed sound profile. Further, the techniques can be implemented such that the transmitter is capable of transmitting the changed sound profile. Further, the techniques can be implemented such that the transmitter is capable of transmitting an initial request for sound profiles, wherein the receiver is further configured to receive a set of sound profiles for a variety of genres, and wherein the processor is further capable of selecting a sound profile matched to the genre of the audio data before applying the sound profile. Further, the techniques can be implemented such that one or more parameters in the sound profile are matched to one or more pieces of information in the metadata. Further, the techniques can be implemented such that the device information comprises demographic information of a user and one or more parameters in the sound profile are matched to the demographic information. Further, the techniques can be implemented such that the device information comprises information related to the consumption modality and one or more parameters in the sound profile are matched to the consumption modality information. Further, the techniques can be implemented to include an amplifier capable of amplifying the modified audio data. Further, the techniques can be implemented such that the sound profile comprises information for three or more channels.

In general, in another aspect, the techniques can be implemented to include a receiver capable of receiving a sound profile, wherein the sound profile contains parameters for modifying audio data; a memory capable of storing the sound profile; and a processor capable of applying the sound profile to audio data to modify the audio data according to the parameters. Further, the techniques can be implemented to include a user interface capable of allowing a user to change one or more of the parameters contained within the sound profile. Further, the techniques can be implemented such that the memory is further capable of storing the modified sound profile and the genre of the audio data, and the processor applies the modified sound profile to a second set of audio data of the same genre. Further, the techniques can be implemented such that the sound profile was created by the same user on a different device. Further, the techniques can be implemented such that the sound profile was modified to match a reproduction device using a sound profile created by the same user on a different device. Further, the techniques can be implemented to include a pair of headphones connected to the processor and capable of reproducing the modified audio data.

In general, in another aspect, the techniques can be implemented to include a memory capable of storing a digital audio file, wherein the digital audio file contains metadata describing the audio data in the digital audio file; a transceiver capable of transmitting one or more pieces of metadata over a network and receiving a sound profile matched to the one or more pieces of metadata, wherein the sound profile contains parameters for modifying the audio data; a user interface capable of allowing a user to adjust the parameters of the sound profile; a processor capable of applying the adjusted parameters to the audio data. Further, the techniques can be implemented such that the metadata includes an intensity score. Further, the techniques can be implemented such that the transceiver is further capable of transmitting the adjusted audio data to speakers capable of reproducing the adjusted audio data. Further, the techniques can be implemented such that the transceiver is further capable of transmitting the adjusted sound profile and identifying information.

These general and specific techniques can be implemented using an apparatus, a method, a system, or any combination of apparatuses, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

Like reference symbols indicate like elements throughout the specification and drawings.

DETAILED DESCRIPTION

Figure 1A:
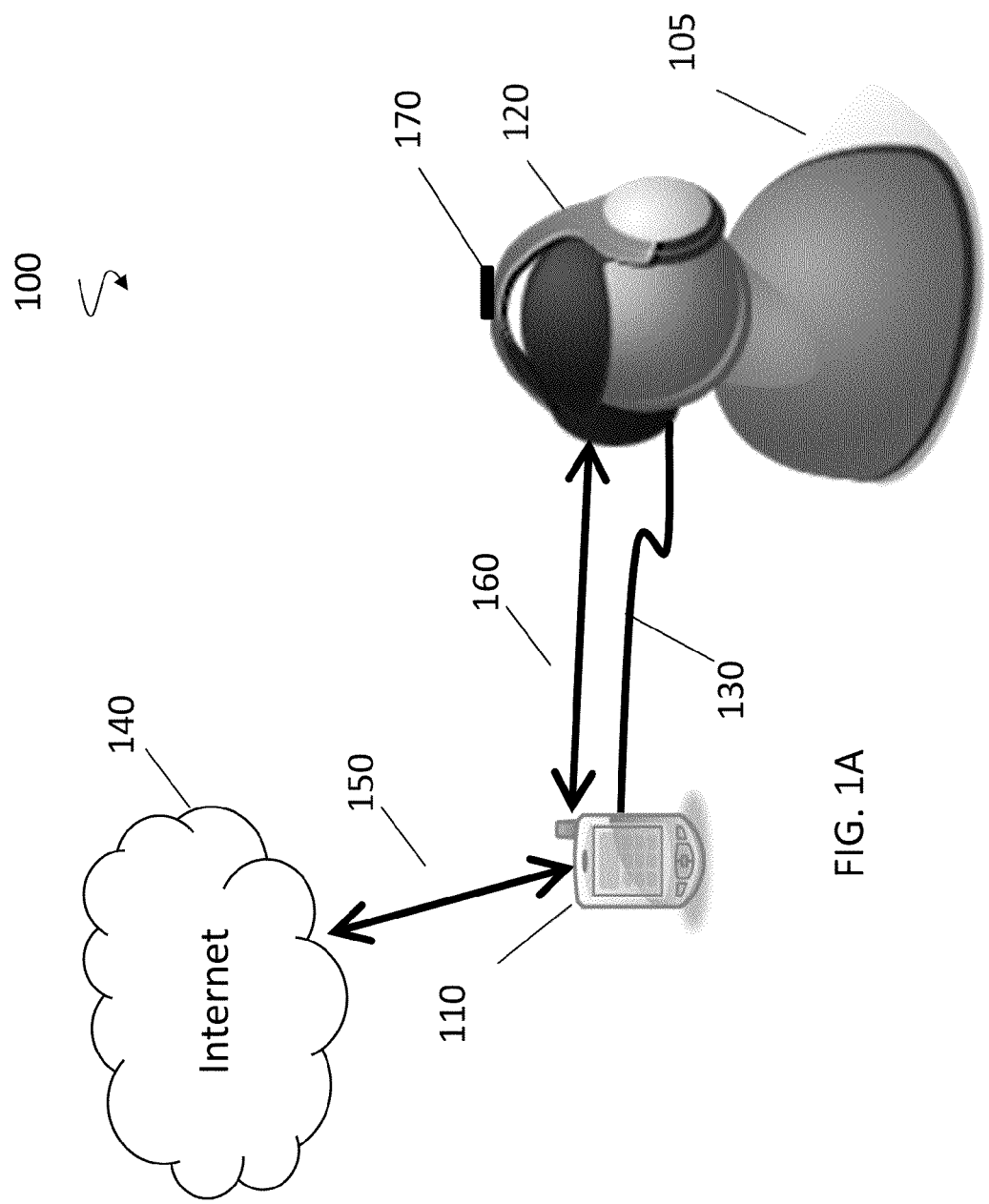
FIG. 1A-C show audio consumers in a range of consumption modalities, including using headphones fed information from a mobile device (1A), in a car or other form of transportation (1B), and in an interior space (1C).

In FIG. 1A, the user 105 is using headphones 120 in a consumption modality 100. Headphones 120 can be of the on-the-ear or over-the-ear type. Headphones 120 can be connected to mobile device 110. Mobile device 110 can be a smartphone, portable music player, portable video game or any other type of mobile device capable of generating entertainment by reproducing audio files. In some implementations, mobile device 110 can be connected to headphone 120 using audio cable 130, which allows mobile device 110 to transmit an audio signal to headphones 120. Such cable 130 can be a traditional audio cable that connects to mobile device 110 using a standard headphone jack. The audio signal transmitted over cable 130 can be of sufficient power to drive, i.e., create sound, at headphones 120. In other implementations, mobile device 110 can alternatively connect to headphones 120 using wireless connection 160. Wireless connection 160 can be a Bluetooth, Low Power Bluetooth, or other networking connection. Wireless connection 160 can transmit audio information in a compressed or uncompressed format. The headphones would then provide their own power source to amplify the audio data and drive the headphones. Mobile device 110 can connect to Internet 140 over networking connection 150 to obtain the sound profile. Networking connection 150 can be wired or wireless.

Headphones 120 can include stereo speakers including separate drivers for the left and right ear to provide distinct audio to each ear. Headphones 120 can include a haptic device 170 to create a bass sensation by providing vibrations through the top of the headphone band. Headphone 120 can also provide vibrations through the left and right ear cups using the same or other haptic devices. Headphone 120 can include additional circuitry to process audio and drive the haptic device.

Mobile device 110 can play compressed audio files, such as those encoded in MP3 or AAC format. Mobile device 110 can decode, obtain, and/or recognize metadata for the audio it is playing back, such as through ID3 tags or other metadata. The audio metadata can include the name of the artists performing the music, the genre, and/or the song title. Mobile device 110 can use the metadata to match a particular song, artist, or genre to a predefined sound profile. The predefined sound profile can be provided by Alpine and downloaded with an application or retrieved from the cloud over networking connection 150. If the audio does not have metadata (e.g., streaming situations), a sample of the audio can be sent and used to determine the genre and other metadata.

Such a sound profile can include which frequencies or audio components to enhance or suppress, e.g., through equalization, signal processing, and/or dynamic noise reduction, allowing the alteration of the reproduction in a way that enhances the auditory experience. The sound profiles can be different for the left and right channel. For example, if a user requires a louder sound in one ear, the sound profile can amplify that channel more. Other known techniques can also be used to create three-dimensional audio effects. In another example, the immersion experience can be tailored to specific music genres. For example, with its typically narrower range of frequencies, the easy listening genre may benefit from dynamic noise compression, while bass-heavy genres (i.e., hip-hop, dance music, and rap) can have enhanced bass and haptic output. Although the immersive initial settings are a unique blending of haptic, audio, and headphone clamping forces, the end user can tune each of these aspects (e.g., haptic, equalization, signal processing, dynamic noise reduction, 3D effects) to suit his or her tastes. Genre-based sound profiles can include rock, pop, classical, hip-hop/rap, and dance music. In another implementation, the sound profile could modify the settings for Alpine's MX algorithm, a proprietary sound enhancement algorithm, or other sound enhancement algorithms known in the art.

Mobile device 110 can obtain the sound profiles in real time, such as when mobile device 110 is streaming music, or can download sound profiles in advance for any music or audio stored on mobile device 110. As described in more detail below, mobile device 110 can allow users to tune the sound profile of their headphone to their own preferences and/or apply predefined sound profiles suited to the genre, artist, song, or the user. For example, mobile device 110 can use Alpine's Tune-It mobile application. Tune-It can allow users quickly modify their headphone devices to suite their individual tastes. Additionally, Tune-It can communicate settings and parameters (metadata) to a server on the Internet, and allow the server to associate sound settings with music genres.

Audio cable 130 or wireless connection 160 can also transmit non-audio information to or from headphones 120. The non-audio information transmitted to headphones 120 can include sound profiles. The non-audio information transmitted from headphones 120 may include device information, e.g., information about the headphones themselves, geographic or demographic information about user 105. Such device information can be used by mobile device 110 in its selection of a sound profile, or combined with additional device information regarding mobile device 110 for transmission over the Internet 140 to assist in the selection of a sound profile in the cloud.

Figure 1B:
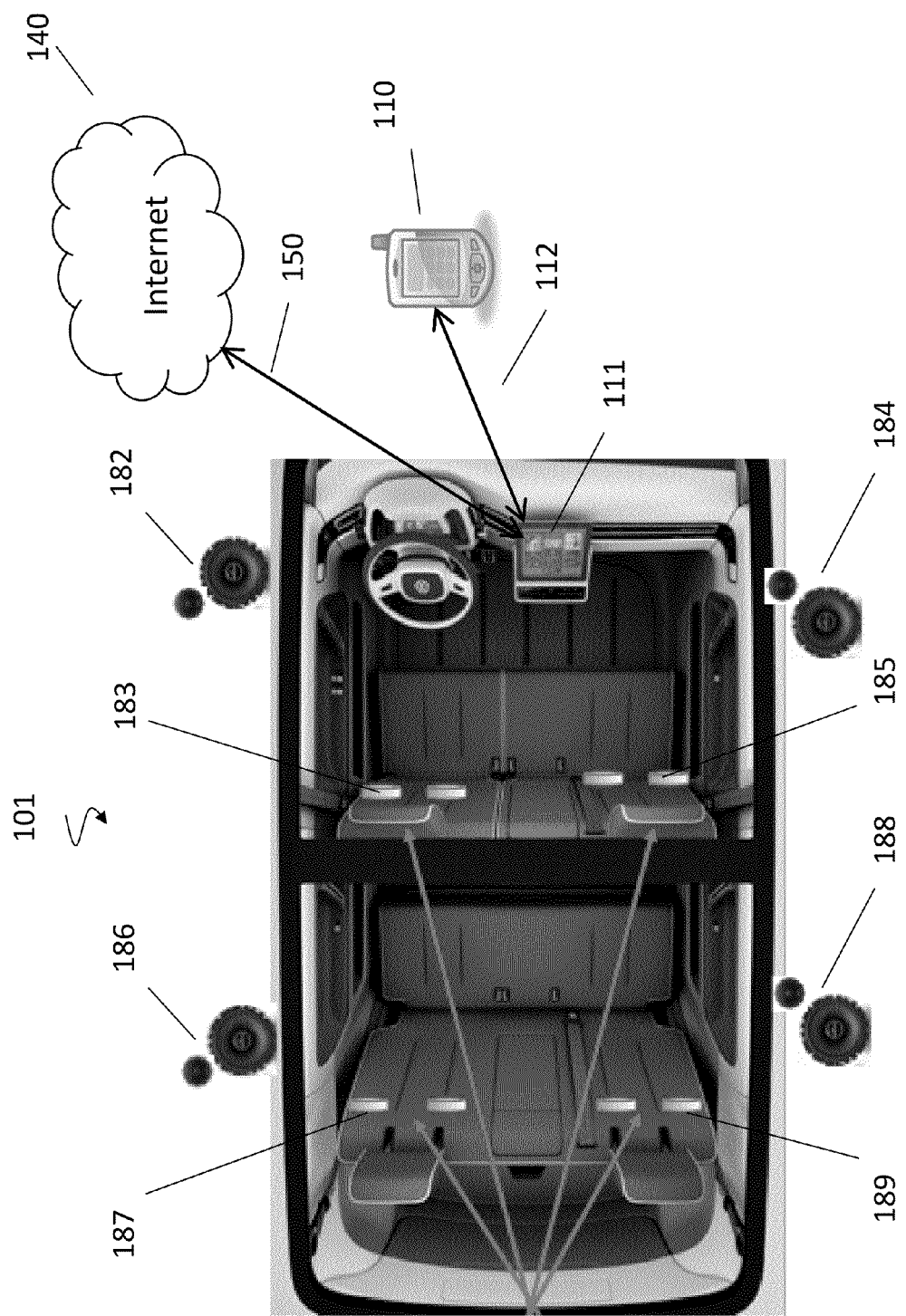

Given their proximity to the ears, when headphones 120 are used to experience auditory entertainment, there is often less interference stemming from the consumption modality itself beyond ambient noise. Other consumption modalities present challenges to the auditory experience, however. For example, FIG. 1B depicts the user in a different modality, namely inside an automobile or analogous mode of transportation such as car 101. Car 101 can have a head unit 111 that plays audio from AM broadcasts, FM broadcasts, CDs, DVDs, flash memory (e.g., USB thumb drives), a connected iPod or iPhone, mobile device 110, or other devices capable of storing or providing audio. Car 101 can have front left speakers 182, front right speakers 184, rear left speakers 186, and rear right speakers 188. Head unit 111 can separately control the content and volume of audio sent to speakers 182, 184, 186, and 188. Car 101 can also include haptic devices for each seat, including front left haptic device 183, front right haptic device 185, rear left haptic device 187, and rear right haptic device 189. Head unit 111 can separately control the content and volume reproduced by haptic devices 183, 185, 187, and 189.

Head unit 111 can create a single low frequency mono channel that drives haptic devices 183, 185, 187, and 189, or head unit 111 can separately drive each haptic device based off the audio sent to the adjacent speaker. For example, haptic device 183 can be driven based on the low-frequency audio sent to speaker 182. Similarly, haptic devices 185, 187, and 189 can be driven based on the low-frequency audio sent to speakers 184, 186, and 188, respectively. Each haptic device can be optimized for low, mid, and high frequencies.

Head unit 111 can utilize sound profiles to optimize the blend of audio and haptic sensation. Head unit 111 can use sound profiles as they are described in reference to mobile device 110 and headset 200.

While some modes of transportation are configured to allow a mobile device 110 to provide auditory entertainment directly, some have a head unit 111 that can independently send information to Internet 140 and receive sound profiles, and still others have a head unit that can communicate with a mobile device 110, for example by Bluetooth connection 112. Whatever the specific arrangement, a networking connection 150 can be made to the Internet 140, over which audio data, associated metadata, and device information can be transmitted as well as sound profiles can be obtained.

In such a transportation modality, there may be significant ambient noise that must be overcome. Given the history of car stereos, many users in the transportation modality have come to expect a bass-heavy sound for audio played in a transportation modality. Reflection and absorbance of sound waves by different materials in the passenger cabin may impact the sounds perceived by passengers, necessitating equalization and compensations. Speakers located in different places within the passenger cabin, such as a front speaker 182 and a rear speaker 188 may generate sound waves that reach passengers at different times, necessitating the introduction of a time delay so each passenger receives the correct compilation of sound waves at the correct moment. All of these modifications to the audio reproduction—as well as others based on the user's unique preferences or suited to the genre, artist, song, the user, or the reproduction device—can be applied either by having the user tune the sound profile or by applying predefined sound profiles.

Figure 1C:
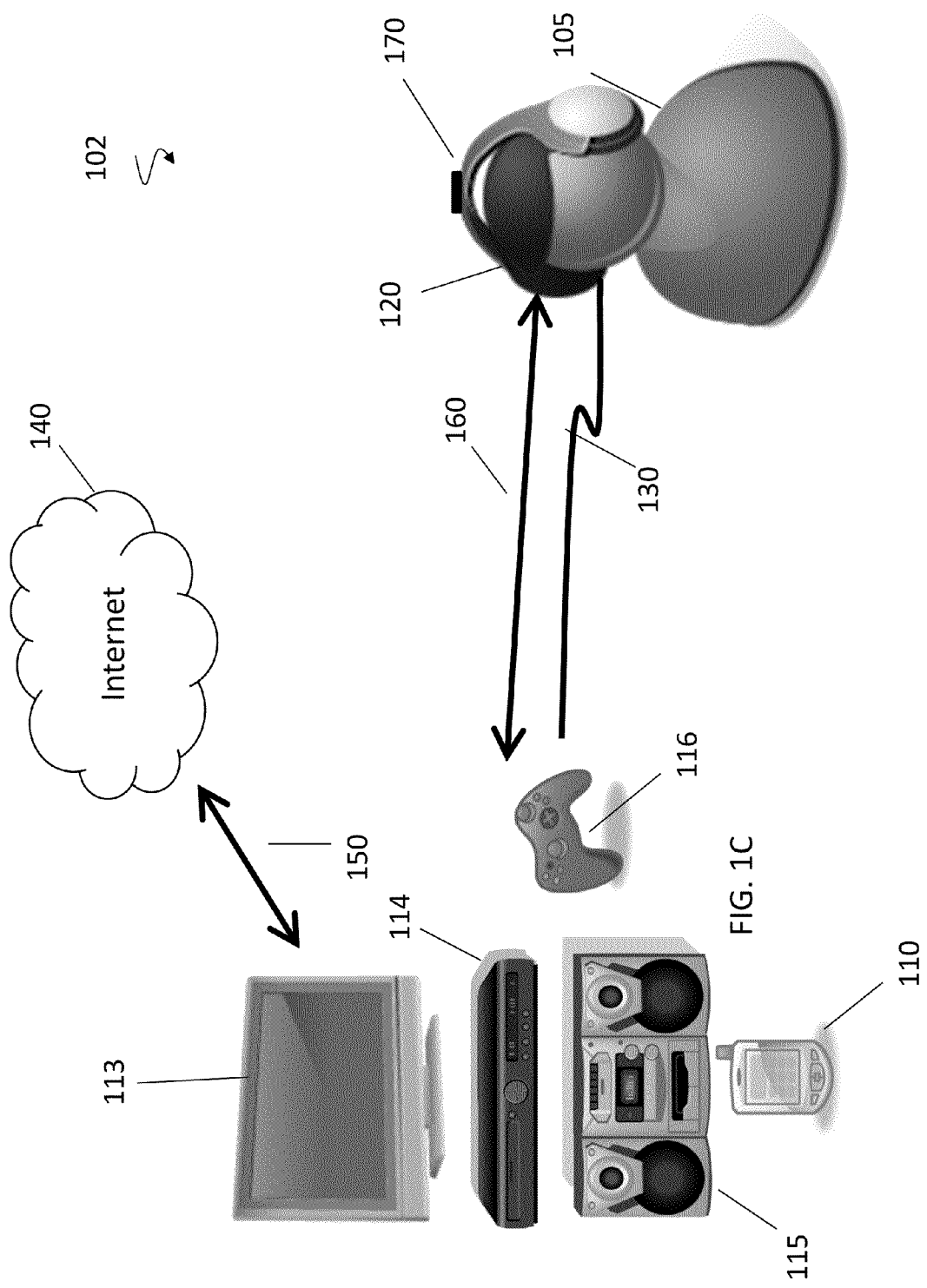

Another environment in which audio entertainment is routinely experienced is modality 102, an indoor modality such as the one depicted in FIG. 1C as a room inside a house. In such an indoor modality, the audio entertainment may come from a number of devices, such as mobile device 110, television 113, media player 114, stereo 115, videogame system 116, or some combination thereof wherein at least one of the devices is connected to Internet 140 through networking connection 150. In modality 102, user 105 may choose to experience auditory entertainment through wired or wireless headphones 120, or via speakers mounted throughout the interior of the space. The speakers could be stereo speakers or surround sound speakers. As in modality 101, in modality 102 reflection and absorbance of sound waves and speaker placement may necessitate modification of the audio data to enhance the auditory experience. Other effects may also be desirable and enhance the audio experience in such an environment. For example, if a user is utilizing headphones in close proximity to someone who is not, dynamic noise compression may help the user from disturbing the nonuser. Such modifications—as well as others based on the user's unique preferences, demographics, or geography, the reproduction device, or suited to the genre, artist, song, or the user—can be applied either by having the user tune the sound profile in modality 102 or by applying predefined sound profiles during reproduction in modality 102.

Similarly, audio entertainment could be experienced outdoors on a patio or deck, in which case there may be almost no reflections. In addition to the various criteria described above, device information including device identifiers or location information could be used to automatically identify an outdoor consumption modality, or a user could manually input the modality. As in the other modalities, sound profiles can be used to modify the audio data so that the auditory experience is enhanced and optimized.

With more users storing and/or accessing media remotely, users will expect their preferences for audio reproduction to be carried across different modalities, such as those represented in FIGS. 1A-C. For example, if a user makes a change in the sound profile for a song while experiencing it in modality 101, the user may expect that same change will be present when next listening to the same song in modality 102. Given the different challenges inherent in each of the consumption modalities, however, not to mention the different reproduction devices that may be present in each modality, for the audio experience to be enhanced and optimized, such user-initiated changes in one modality may need to be harmonized or combined with other, additional modifications unique to the second modality. These multiple and complex modifications can be accomplished through sound profiles, even if the user does not necessarily appreciate the intricacies involved.

Figure 2:
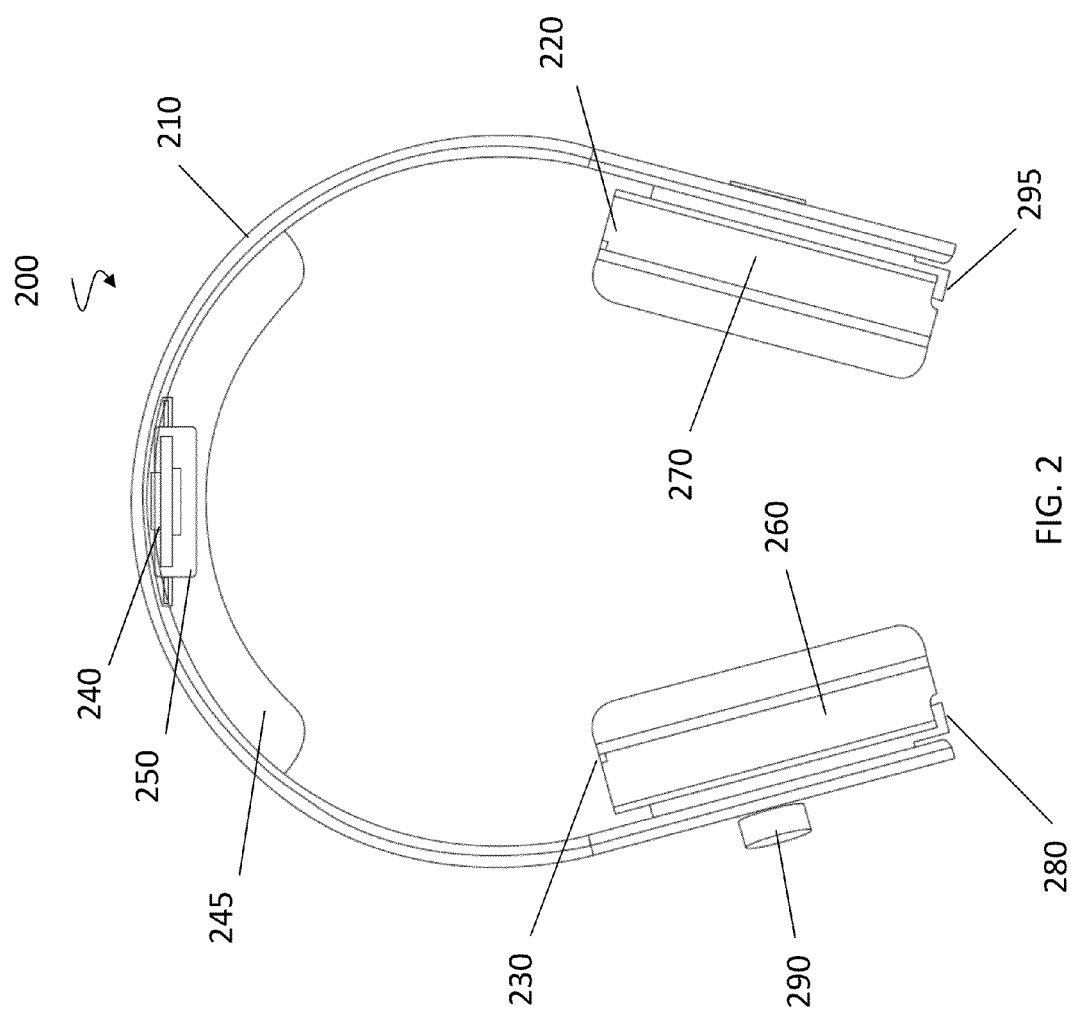
FIG. 2 shows headphones including a haptic device.

FIG. 2 shows headphones including a haptic device. In particular, headphones 200 includes headband 210. Right ear cup 220 is attached to one end of headband 210. Right ear cup 220 can include a driver that pushes a speaker to reproduce audio. Left ear cup 230 is attached to the opposite end of headband 210 and can similarly include a driver that pushes a speaker to reproduce audio. The top of headband 210 can include haptic device 240. Haptic device 240 can be covered by cover 250. Padding 245 can cover the cover 250. Right ear cup 220 can include a power source 270 and recharging jack 295. Left ear cup 230 can include signal processing components 260 inside of it, and headphone jack 280. Left ear cup 230 can have control 290 attached. Headphone jack 280 can accept an audio cable to receive audio signals from a mobile device. Control 290 can be used to adjust audio settings, such as to increase the bass response or the haptic response. In other implementations, the location of power source 270, recharging jack 295, headphone jack 280, and signal processing components 260 can swap ear cups, or be combined into either single ear cup.

Multiple components are involved in both the haptic and sound profile functions of the headphones. These functions are discussed on a component-by-component basis below.

Power source 270 can be a battery or other power storage device known in the art. In one implementation it can be one or more batteries that are removable and replaceable. For example, it could be an AAA alkaline battery. In another implementation it could be a rechargeable battery that is not removable. Right ear cup 270 can include recharging jack 295 to recharge the battery. Recharging jack 295 can be in the micro USB format. Power source 270 can provide power to signal processing components 260. Power source 270 can provide power to signal processing components 260. Power source 270 can last at least 10 hours.

Signal processing components 260 can receive stereo signals from headphone jack 280 or through a wireless networking device, process sound profiles received from headphone jack 280 or through wireless networking, create a mono signal for haptic device 240, and amplify the mono signal to drive haptic device 240. In another implementation, signal processing components 260 can also amplify the right audio channel that drives the driver in the right ear cup and amplify the left audio channel that drives the left audio cup. Signal processing components 260 can deliver a low pass filtered signal to the haptic device that is mono in nature but derived from both channels of the stereo audio signal. Because it can be difficult for users to distinguish the direction or the source of bass in a home or automotive environment, combining the low frequency signals into a mono signal for bass reproduction can simulate a home or car audio environment. In another implementation, signal processing components 260 can deliver stereo low-pass filtered signals to haptic device 240.

In one implementation, signal processing components 260 can include an analog low-pass filter. The analog low-pass filter can use inductors, resistors, and/or capacitors to attenuate high-frequency signals from the audio. Signal processing components 260 can use analog components to combine the signals from the left and right channels to create a mono signal, and to amplify the low-pass signal sent to haptic device 240.

In another implementation, signal processing components 260 can be digital. The digital components can receive the audio information, via a network. Alternatively, they can receive the audio information from an analog source, convert the audio to digital, low-pass filter the audio using a digital signal processor, and provide the low-pass filtered audio to a digital amplifier.

Control 290 can be used to modify the audio experience. In one implementation, control 290 can be used to adjust the volume. In another implementation, control 290 can be used to adjust the bass response or to separately adjust the haptic response. Control 290 can provide an input to signal processing components 260.

Haptic device 240 can be made from a small transducer (e.g., a motor element) which transmits low frequencies (e.g., 1 Hz-100 Hz) to the headband. The small transducer can be less than 1.5" in size and can consume less than 1 watt of power. Haptic device 240 can be an off-the shelf haptic device commonly used in touch screens or for exciters to turn glass or plastic into a speaker. Haptic device 240 can use a voice coil or magnet to create the vibrations.

Haptic device 240 can be positioned so it is displacing directly on the headband 210. This position allows much smaller and thus power efficient transducers to be utilized. The housing assembly for haptic device 240, including cover 250, is free-floating, which can maximize articulation of haptic device 240 and reduces dampening of its signal.

The weight of haptic device 240 can be selected as a ratio to the mass of the headband 210. The mass of haptic device 240 can be selected directly proportional to the rigid structure to enable sufficient acoustic and mechanical energy to be transmitted to the ear cups. If the mass of haptic device 240 were selected to be significantly lower than the mass of the headband 210, then headband 210 would dampen all mechanical and acoustic energy. Conversely, if the mass of haptic device 240 were significantly higher than the mass of the rigid structure, then the weight of the headphone would be unpleasant for extended usage and may lead to user fatigue. Haptic device 240 is optimally placed in the top of headband 210. This positioning allows the gravity of the headband to generate a downward force that increases the transmission of mechanical vibrations from the haptic device to the user. The top of the head also contains a thinner layer of skin and thus locating haptic device 240 here provides more proximate contact to the skull. The unique position of haptic device 240 can enable the user to experience an immersive experience that is not typically delivered via traditional headphones with drivers located merely in the headphone cups.

The haptic device can limit its reproduction to low frequency audio content. For example, the audio content can be limited to less than 100 Hz. Vibrations from haptic device 240 can be transmitted from haptic device 240 to the user through three contact points: the top of the skull, the left ear cup, and the right ear cup. This creates an immersive bass experience. Because headphones have limited power storage capacities and thus require higher energy efficiencies to satisfy desired battery life, the use of a single transducer in a location that maximizes transmission across the three contact points also creates a power-efficient bass reproduction.

Cover 250 can allow haptic device 240 to vibrate freely. Headphone 200 can function without cover 250, but the absence of cover 250 can reduce the intensity of vibrations from haptic device 240 when a user's skull presses too tightly against haptic device 240.

Padding 245 covers haptic device 240 and cover 250. Depending on its size, shape, and composition, padding 245 can further facilitate the transmission of the audio and mechanical energy from haptic device 240 to the skull of a user. For example, padding 245 can distribute the transmission of audio and mechanical energy across the skull based on its size and shape to increase the immersive audio experience. Padding 245 can also dampen the vibrations from haptic device 240.

Headband 210 can be a rigid structure, allowing the low frequency energy from haptic device 240 to transfer down the band, through the left ear cup 230 and right ear cup 220 to the user. Forming headband 210 of a rigid material facilitates efficient transmission of low frequency audio to ear cups 230 and 220. For example, headband 210 can be made from hard plastic like polycarbonate or a lightweight metal like aluminum. In another implementation, headband 210 can be made from spring steel. Headband 210 can be made such that the material is optimized for mechanical and acoustic transmissibility through the material. Headband 210 can be made by selecting specific type materials as well as a form factor that maximizes transmission. For example, by utilizing reinforced ribbing in headband 210, the amount of energy dampened by the rigid band can be reduced and enable more efficient transmission of the mechanical and acoustic frequencies to be passed to the ear cups 220 and 230.

Headband 210 can be made with a clamping force measured between ear cups 220 and 230 such that the clamping force is not so tight as to reduce vibrations and not so loose as to minimize transmission of the vibrations. The clamping force can be in the range of 300 g to 700 g.

Ear cups 220 and 230 can be designed to fit over the ears and to cover the whole ear. Ear cups 220 and 230 can be designed to couple and transmit the low frequency audio and mechanical energy to the user's head. Ear cups 220 and 230 may be static. In another implementation, ear cups 220 and 230 can swivel, with the cups continuing to be attached to headband 210 such that they transmit audio and mechanical energy from headband 210 to the user regardless of their positioning.

Vibration and audio can be transmitted to the user via multiple methods including auditory via the ear canal, and bone conduction via the skull of the user. Transmission via bone conduction can occur at the top of the skull and around the ears through ear cups 220 and 230. This feature creates both an aural and tactile experience for the user that is similar to the audio a user experiences when listening to audio from a system that uses a subwoofer. For example, this arrangement can create a headphone environment where the user truly feels the bass.

In another aspect, some or all of the internal components could be found in an amplifier and speaker system found in a house or a car. For example, the internal components of headphone 200 could be found in a car stereo head unit with the speakers found in the dash and doors of the car.

Figure 3:
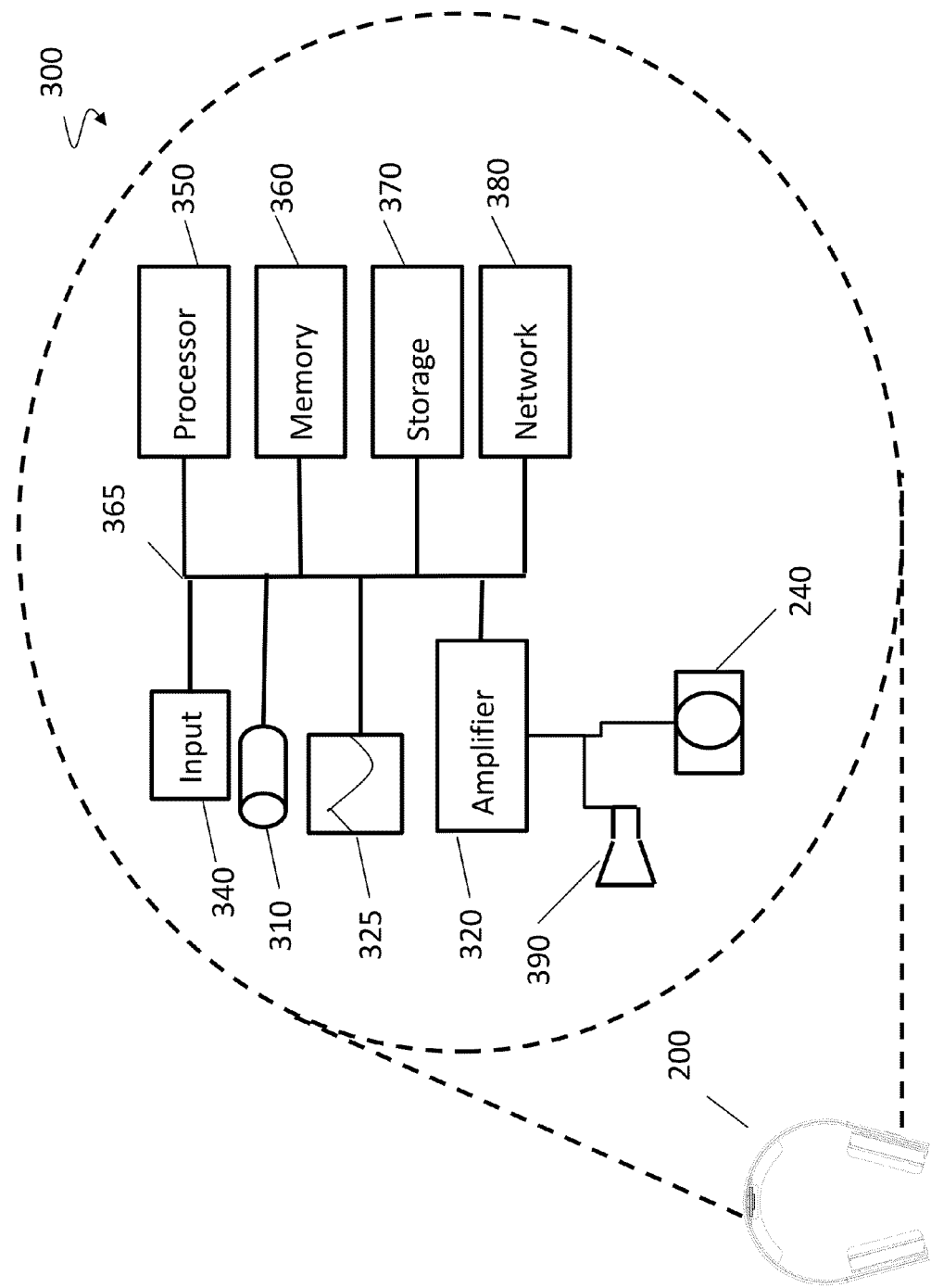
FIG. 3 shows a block diagram of an audio reproduction system.

FIG. 3 shows a block diagram of a reproduction system 300 that can be used to implement the techniques described herein for an enhanced audio experience. Reproduction system 300 can be implemented inside of headphones 200. Reproduction system 300 can be part of signal processing components 260. Reproduction system 300 can include bus 365 that connects the various components. Bus 365 can be composed of multiple channels or wires, and can include one or more physical connections to permit unidirectional or omnidirectional communication between two or more of the components in reproduction system 300. Alternatively, components connected to bus 365 can be connected to reproduction system 300 through wireless technologies such as Bluetooth, Wifi, or cellular technology.

An input 340 including one or more input devices can be configured to receive instructions and information. For example, in some implementations input 340 can include a number of buttons. In some other implementations input 340 can include one or more of a touch pad, a touch screen, a cable interface, and any other such input devices known in the art. Input 340 can include knob 290. Further, audio and image signals also can be received by the reproduction system 300 through the input 340.

Headphone jack 310 can be configured to receive audio and/or data information. Audio information can include stereo or other multichannel information. Data information can include metadata or sound profiles. Data information can be sent between segments of audio information, for example between songs, or modulated to inaudible frequencies and transmitted with the audio information.

Further, reproduction system 300 can also include network interface 380. Network interface 380 can be wired or wireless. A wireless network interface 380 can include one or more radios for making one or more simultaneous communication connections (e.g., wireless, Bluetooth, low power Bluetooth, cellular systems, PCS systems, or satellite communications). Network interface 380 can receive audio information, including stereo or multichannel audio, or data information, including metadata or sound profiles.

An audio signal, user input, metadata, other input or any portion or combination thereof can be processed in reproduction system 300 using the processor 350. Processor 350 can be used to perform analysis, processing, editing, playback functions, or to combine various signals, including adding metadata to either or both of audio and image signals. Processor 350 can use memory 360 to aid in the processing of various signals, e.g., by storing intermediate results. Processor 350 can include A/D processors to convert analog audio information to digital information. Processor 350 can also include interfaces to pass digital audio information to amplifier 320. Processor 350 can process the audio information to apply sound profiles, create a mono signal and apply low pass filter. Processor 350 can also apply Alpine's MX algorithm.

Processor 350 can low pass filter audio information using an active low pass filter to allow for higher performance and the least amount of signal attenuation. The low pass filter can have a cut off of approximately 80 Hz-100 Hz. The cut off frequency can be adjusted based on settings received from input 340 or network 380. Processor 350 can parse and/or analyze metadata and request sound profiles via network 380.

In another implementation, passive filter 325 can combine the stereo audio signals into a mono signal, apply the low pass filter, and send the mono low pass filter signal to amplifier 320.

Memory 360 can be volatile or non-volatile memory. Either or both of original and processed signals can be stored in memory 360 for processing or stored in storage 370 for persistent storage. Further, storage 370 can be integrated or removable storage such as Secure Digital, Secure Digital High Capacity, Memory Stick, USB memory, compact flash, xD Picture Card, or a hard drive.

The audio signals accessible in reproduction system 300 can be sent to amplifier 320. Amplifier 320 can separately amplify each stereo channel and the low-pass mono channel. Amplifier 320 can transmit the amplified signals to speakers 390 and haptic device 240. In another implementation, amplifier 320 can solely power haptic device 240. Amplifier 320 can consume less than 2.5 Watts.

While reproduction system 300 is depicted as internal to a pair of headphones 200, it can also be incorporated into a home audio system or a car stereo system.

Figure 4:
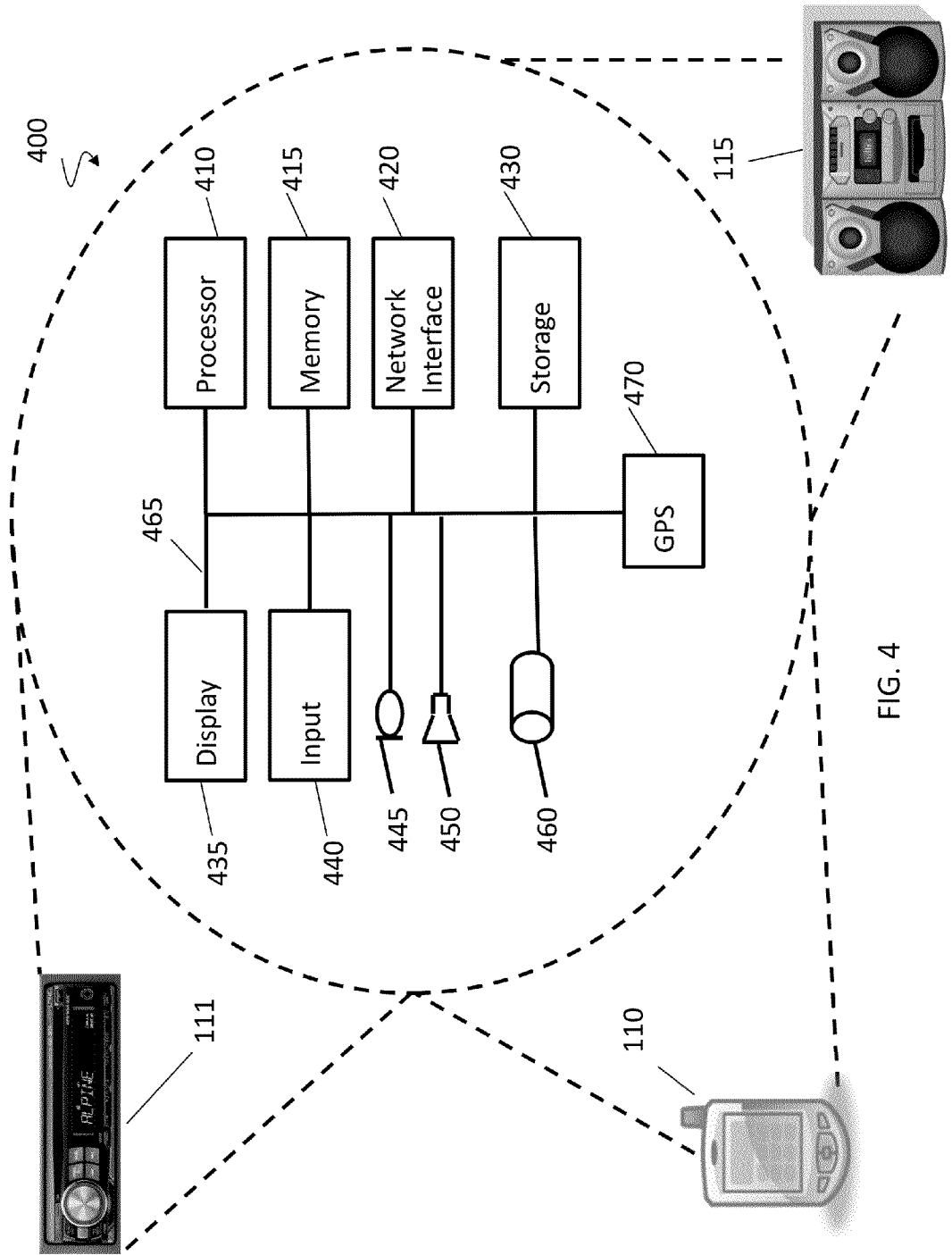
FIG. 4 shows a block diagram of a device capable of playing audio files.

FIG. 4 shows a block diagram of mobile device 110, head unit 111, stereo 115 or other device similarly capable of playing audio files. FIG. 4 presents a computer system 400 that can be used to implement the techniques described herein for sharing digital media. Computer system 400 can be implemented inside of mobile device 110, head unit 111, stereo 115, or other device similar capable of playing audio files. Bus 465 can include one or more physical connections and can permit unidirectional or omnidirectional communication between two or more of the components in the computer system 400. Alternatively, components connected to bus 465 can be connected to computer system 400 through wireless technologies such as Bluetooth, Wifi, or cellular technology. The computer system 400 can include a microphone 445 for receiving sound and converting it to a digital audio signal. The microphone 445 can be coupled to bus 465, which can transfer the audio signal to one or more other components. Computer system 400 can include a headphone jack 460 for transmitting audio and data information to headphones and other audio devices.

An input 440 including one or more input devices also can be configured to receive instructions and information. For example, in some implementations input 440 can include a number of buttons. In some other implementations input 440 can include one or more of a mouse, a keyboard, a touch pad, a touch screen, a joystick, a cable interface, voice recognition, and any other such input devices known in the art. Further, audio and image signals also can be received by the computer system 400 through the input 440 and/or microphone 445.

Further, computer system 400 can include network interface 420. Network interface 420 can be wired or wireless. A wireless network interface 420 can include one or more radios for making one or more simultaneous communication connections (e.g., wireless, Bluetooth, low power Bluetooth, cellular systems, PCS systems, or satellite communications). A wired network interface 420 can be implemented using an Ethernet adapter or other wired infrastructure.

Computer system 400 may include a GPS receiver 470 to determine its geographic location. Alternatively, geographic location information can be programmed into memory 415 using input 440 or received via network interface 420. Information about the consumption modality, e.g., whether it is indoors, outdoors, etc., may similarly be retrieved or programmed. The user may also personalize computer system 400 by indicating their age, demographics, and other information that can be used to tune sound profiles.

An audio signal, image signal, user input, metadata, geographic information, user, reproduction device, or modality information, other input or any portion or combination thereof, can be processed in the computer system 400 using the processor 410. Processor 410 can be used to perform analysis, processing, editing, playback functions, or to combine various signals, including parsing metadata to either or both of audio and image signals.

For example, processor 410 can parse and/or analyze metadata from a song or video stored on computer system 400 or being streamed across network interface 420. Processor 410 can use the metadata to request sound profiles from the Internet through network interface 420 or from storage 430 for the specific song, game or video based on the artist, genre, or specific song or video. Processor 410 can provide information through the network interface 420 to allow selection of a sound profile based on device information such as geography, user ID, user demographics, device ID, consumption modality, the type of reproduction device (e.g., mobile device, head unit, or Bluetooth speakers), reproduction device, or speaker arrangement (e.g., headphones plugged or multi-channel surround sound). The user ID can be anonymous but specific to an individual user or use real world identification information.

Processor 410 can then use input received from input 440 to modify a sound profile according to a user's preferences. Processor 410 can then transmit the sound profile to a headphone connected through network interface 420 or headphone jack 460 and/or store a new sound profile in storage 430. Processor 410 can run applications on computer system 400 like Alpine's Tune-It mobile application, which can adjust sound profiles. The sound profiles can be used to adjust Alpine's MX algorithm.

Processor 410 can use memory 415 to aid in the processing of various signals, e.g., by storing intermediate results. Memory 415 can be volatile or non-volatile memory. Either or both of original and processed signals can be stored in memory 415 for processing or stored in storage 430 for persistent storage. Further, storage 430 can be integrated or removable storage such as Secure Digital, Secure Digital High Capacity, Memory Stick, USB memory, compact flash, xD Picture Card, or a hard drive.

Image signals accessible in computer system 400 can be presented on a display device 435, which can be an LCD display, printer, projector, plasma display, or other display device. Display 435 also can display one or more user interfaces such as an input interface. The audio signals available in computer system 400 also can be presented through output 450. Output device 450 can be a speaker, multiple speakers, and/or speakers in combination with one or more haptic devices. Headphone jack 460 can also be used to communicate digital or analog information, including audio and sound profiles.

Computer system 400 could include passive filter 325, amplifier 320, speaker 390, and haptic device 240 as describe above with reference to FIG. 3, and be installed inside headphone 200.

Figure 5:
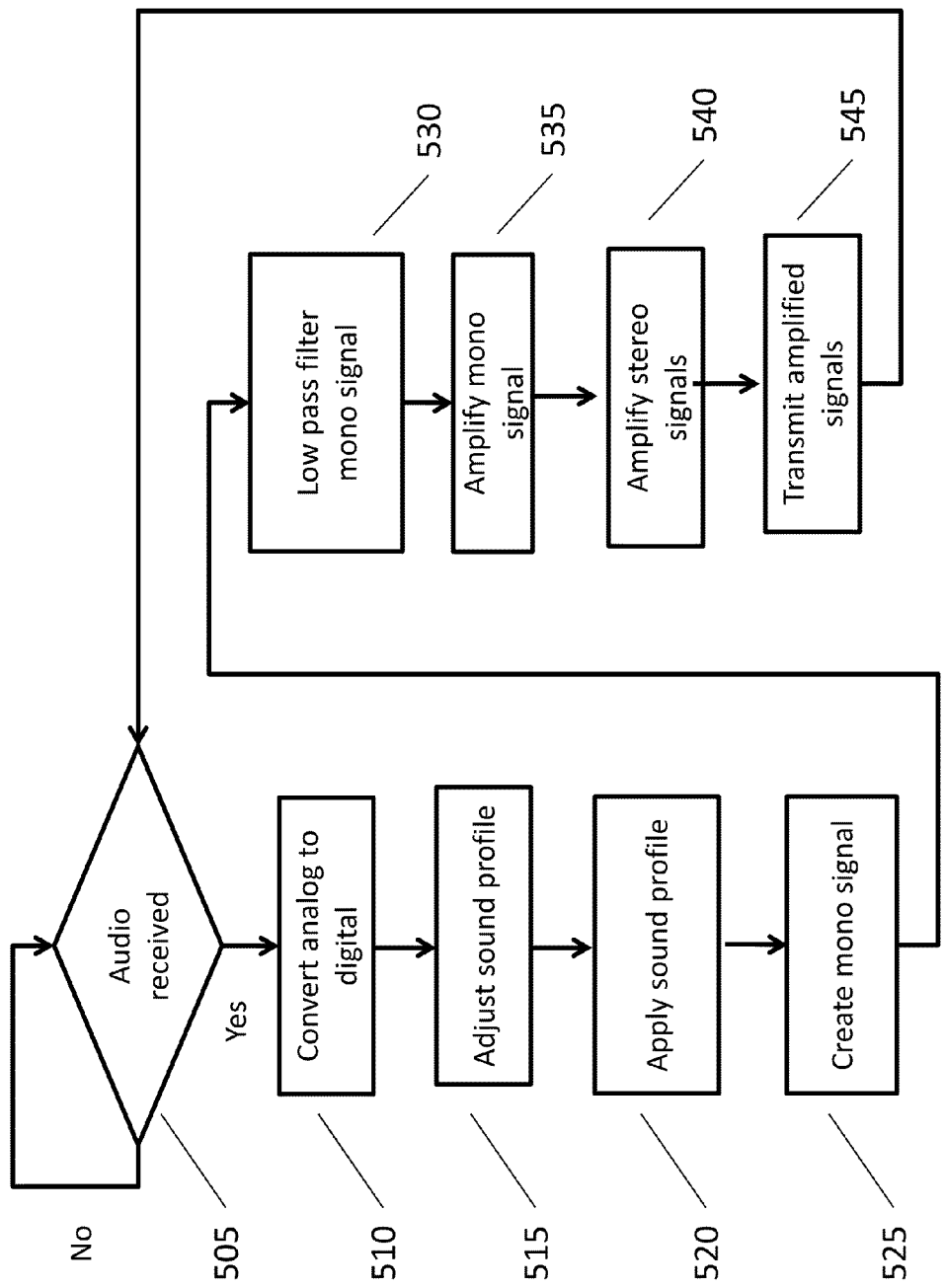
FIG. 5 shows steps for processing information for reproduction in a reproduction device.

FIG. 5 shows steps for processing information for reproduction in headphones or other audio reproduction devices. Headphones can monitor a connection to determine when audio is received, either through an analog connection or digitally (505). When audio is received, any analog audio can be converted from analog to digital (510) if a digital filter is used. The sound profile can be adjusted according to user input (e.g., a control knob) on the headphones (515). The headphones can apply a sound profile (520). The headphones can then create a mono signal (525) using known mixing techniques. The mono signal can be low-pass filtered (530). The low-pass filtered mono signal can be amplified (535). In some implementations (e.g., when the audio is digital), the stereo audio signal can also be amplified (540). The amplified signals can then be transmitted to their respective drivers (545). For example, the low-pass filtered mono signal can be sent to a haptic device and the amplified left and right channel can be sent to the left and right drivers respectively.

FIGS. 3 and 4 show systems capable of performing these steps. The steps described in FIG. 5 need not be performed in the order recited and two or more steps can be performed in parallel or combined. In some implementations, other types of media also can be shared or manipulated, including audio or video.

Figure 6:
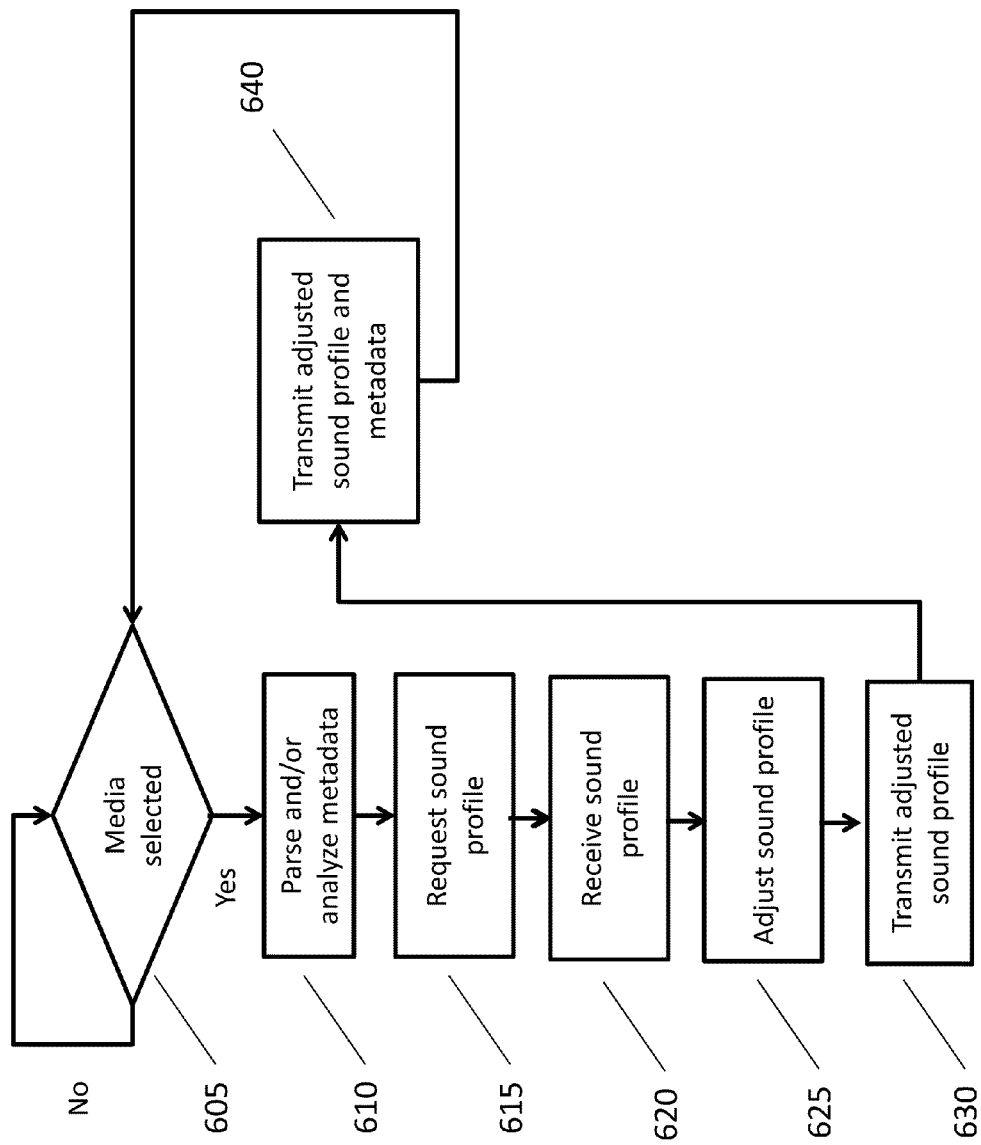
FIG. 6 shows steps for obtaining and applying sound profiles.

FIG. 6 shows steps for obtaining and applying sound profiles. Mobile device 110, head unit 111, stereo 115 or other device similarly capable of playing audio files can wait for media to be selected for reproduction or loaded onto a mobile device (605). The media can be a song, album, game, or movie. Once the media is selected, metadata for the media is parsed and/or analyzed to determine if the media contains music, voice, or a movie, and what additional details are available such as the artist, genre or song name (610). Additional device information, such as geography, user ID, user demographics, device ID, consumption modality, the type of reproduction device (e.g., mobile device, head unit, or Bluetooth speakers), reproduction device, or speaker arrangement (e.g., headphones plugged or multi-channel surround sound), may also be parsed and/or analyzed in step 610. The parsed/analyzed data is used to request a sound profile from a server over a network, such as the Internet, or from local storage (615). For example, Alpine could maintain a database of sound profiles matched to various types of media and matched to various types of reproduction devices. The sound profile could contain parameters for increasing or decreasing various frequency bands and other sound parameters for enhancing portions of the audio. Such aspects could include dynamic equalization, crossover gain, dynamic noise compression, time delays, and/or three-dimensional audio effects. Alternatively, the sound profile could contain parameters for modifying Alpine's MX algorithm. The sound profile is received (620) and then adjusted to a particular user's preference (625) if necessary. The adjusted sound profile is then transmitted (630) to a reproduction device, such as a pair of headphones. The adjusted profile and its associated metadata can also be transmitted (640) to the server where the sound profile, its metadata, and the association is stored, both for later analysis and use by the user.

FIGS. 3 and 4 show systems capable of performing these steps. The steps described in FIG. 6 could also be performed in headphones connected to a network without the need of an additional mobile device. The steps described in FIG. 6 need not be performed in the order recited and two or more steps can be performed in parallel or combined. In some implementations, other types of media also can be shared or manipulated, including audio or video.

Figure 7:
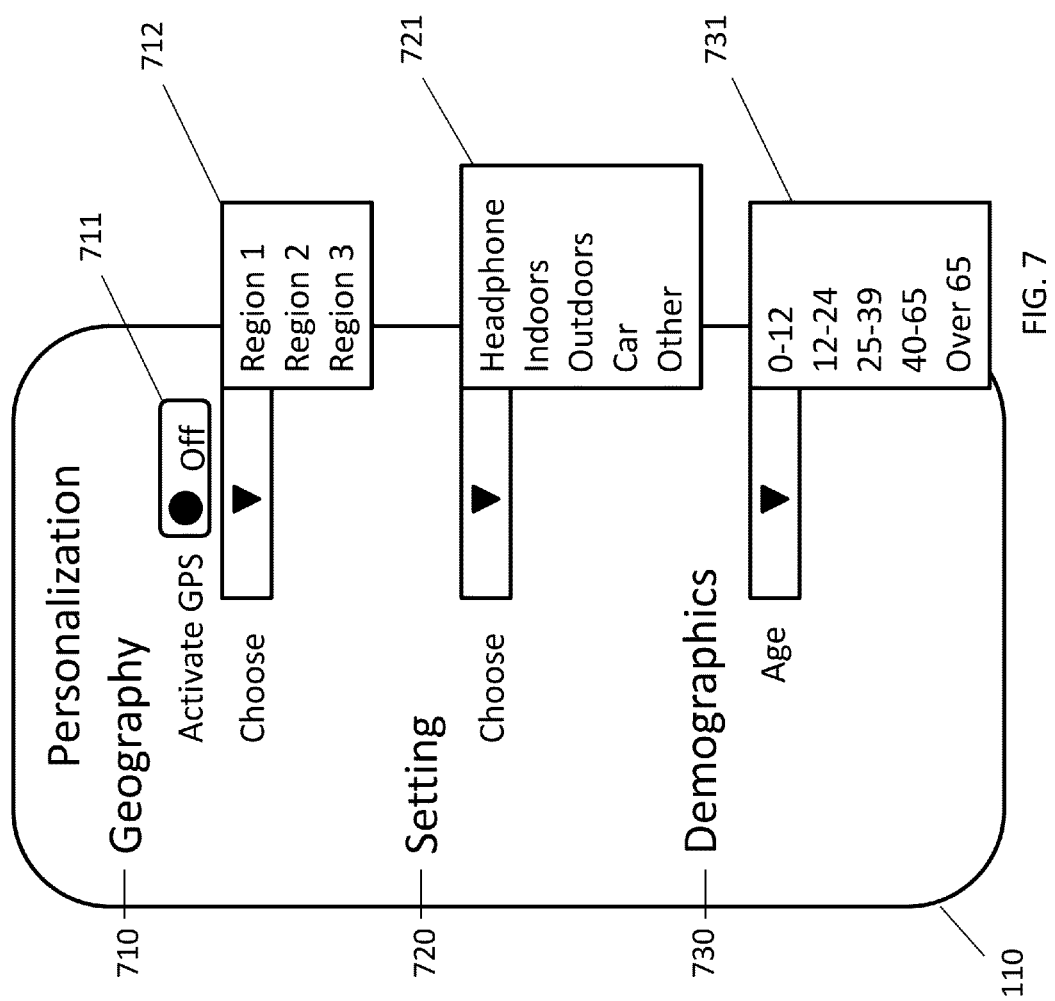
FIG. 7 shows an exemplary user interface by which the user can input geographic, consumption modality, and demographic information for use in sound profiles.

FIG. 7 shows an exemplary user interface by which the user can input geographic, consumption modality, and demographic information for use in creating or retrieving sound profiles for a reproduction device such as mobile device 110, head unit 111, or stereo 115. Field 710 allows the user to input geographical information in at least two ways. First, switch 711 allows the user to activate or deactivate the GPS receiver. When activated, the GPS receiver can identify the current geographical position of device 110, and uses that location as the geographical parameter when selecting a sound profile. Alternatively, the user can set a geographical preference using some sort of choosing mechanism, such as the drop-down list 712. Given the wide variety of effective techniques for creating user interfaces, one skilled in the art will also appreciate many alternative mechanisms by which such geographic selection could be accomplished. Field 720 of the user interface depicted in FIG. 7 allows the user to select among various modalities in which the user may be experiencing the audio entertainment. While drop-down list 721 is one potential tool for this task, one skilled in the art will appreciate that others could be equally effective. The user's selection in field 720 can be used as the modality parameter when selecting a sound profile. Field 730 of the user interface depicted in FIG. 7 allows the user to input certain demographic information for use in selecting a sound profile. One such piece of information could be age, given the changing musical styles and preferences among different generations. Similarly, ethnicity and cultural information could be used as inputs to account for varying musical preferences within the country and around the world. This information can also be inferred based on metadata patterns found in media preferences. Again, drop-down 731 is shown as one potential tool for this task, while other, alternative tools could also be used.

Figure 8:
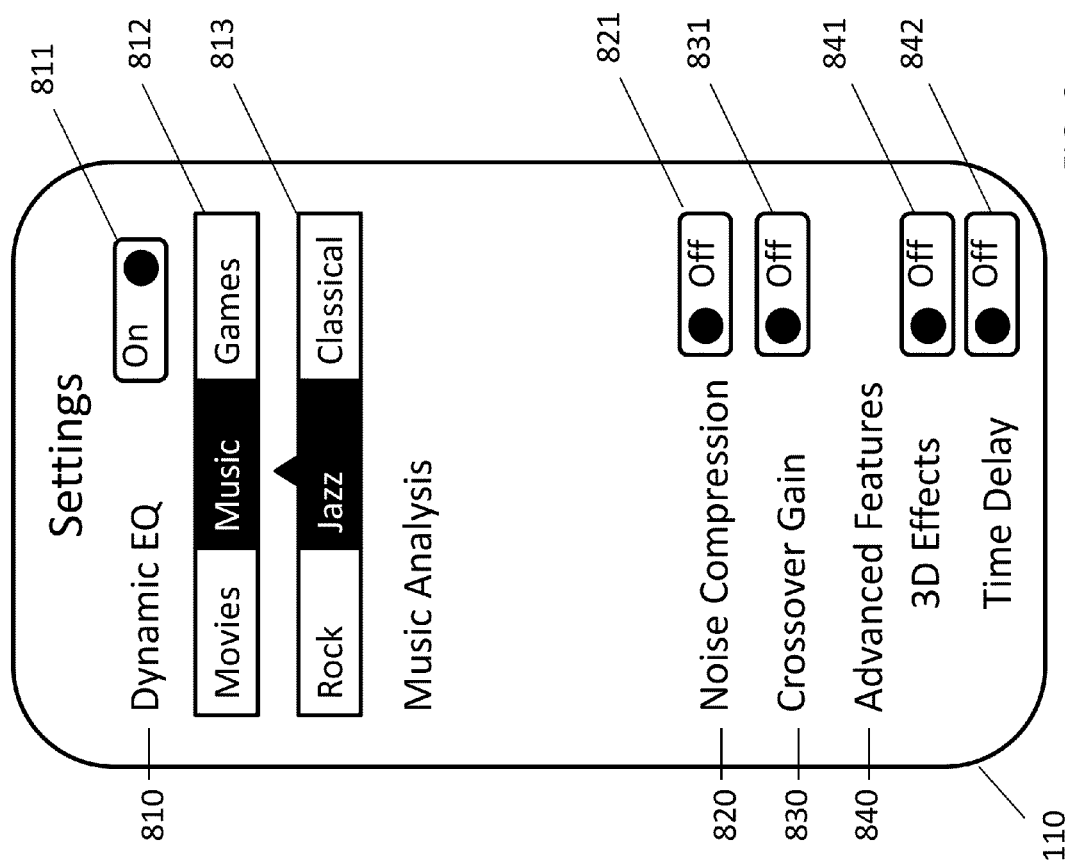
FIG. 8 shows an exemplary user interface by which the user can determine which aspects of tuning should be utilized in applying a sound profile.

FIG. 8 shows an exemplary user interface by which the user can select which aspects of tuning should be utilized when a sound profile is applied. Field 810 corresponds to dynamic equalization, which can be activated or deactivated by a switch such as item 811. When dynamic equalization is activated, selector 812 allows the user to select which type of audio entertainment the user wishes to manually adjust, while selector 813 presents subchoices within each type. For example, if a user selects "Music" with selector 812, selector 813 could present different genres, such as "Rock," "Jazz," and "Classical." Based on the user's choice, a genre-specific sound profile can be retrieved from memory or the server, and either used as-is or further modified by the user using additional interface elements on subscreens that can appear when dynamic equalization is activated. Fields 820, 830, and 840 operate in similar fashion, allowing the user to activate or deactivate tuning aspects such as noise compression, crossover gain, and advanced features using switches 821, 831, 831, and 842. As each aspect is activated, controls specific to each aspect can be revealed to the user. For example, turning on noise compression can reveal a sider that controls the amount of noise compression. Turning on crossover gain can reveal sliders that control both crossover frequency and one or more gains. While the switches presented represent one interface tool for activating and deactivating these aspects, one will appreciate that other, alternative interface tools could be employed to achieve similar results.

Figure 9:
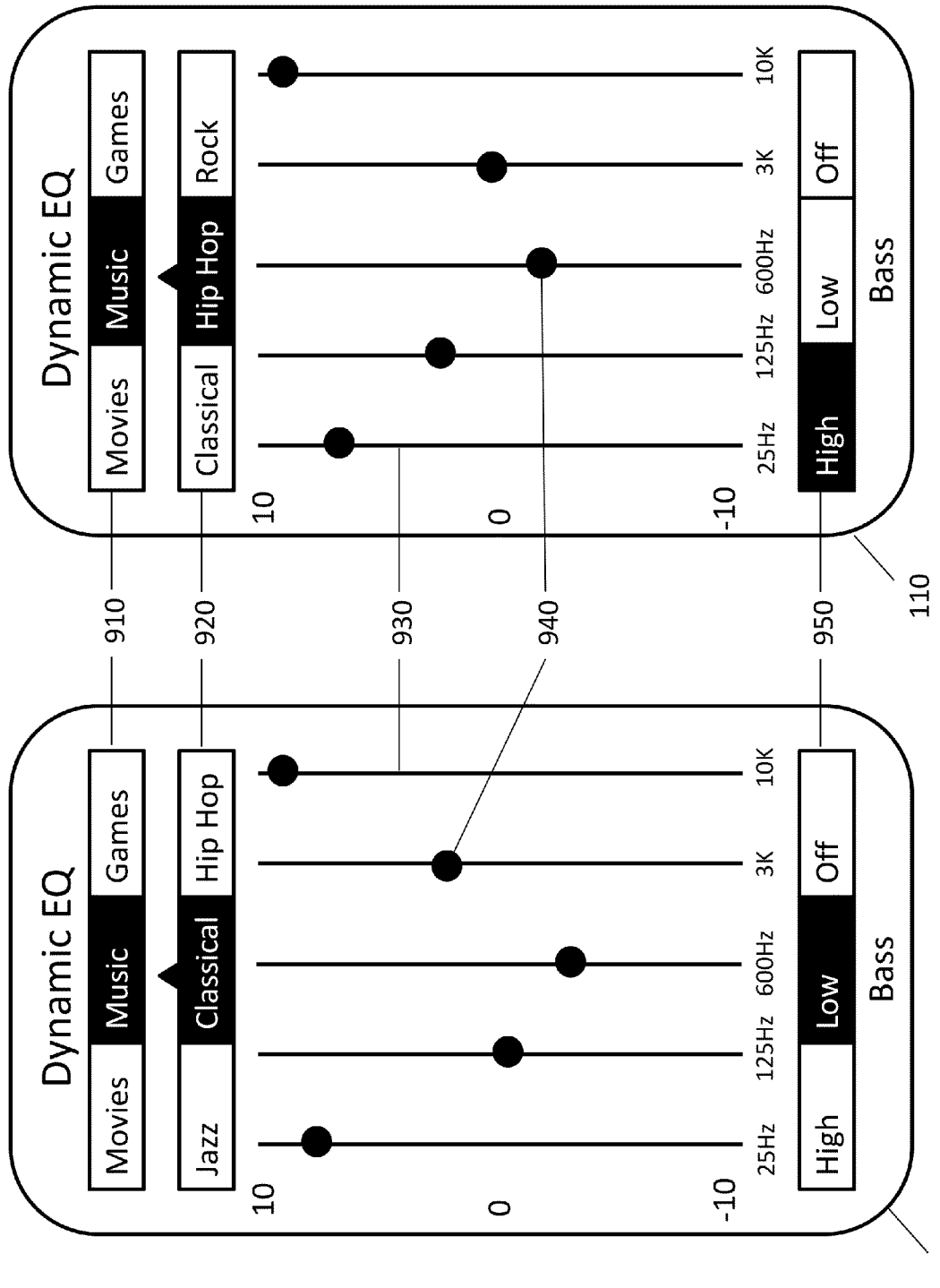
FIGS. 9A-B show subscreens of an exemplary user interface by which the user has made detailed changes to the dynamic equalization settings of sound profiles for songs in two different genres.

FIGS. 9A-B show subscreens of an exemplary user interface by which the user can make detailed changes to the equalization settings of sound profiles for songs in two different genres, one "Classical" and one "Hip Hop." Similarly to the structures discussed with respect to FIG. 8, selector 910 allows the user to select which type of audio entertainment the user can be experiencing, while selector 920 provides choices within each type. Here, because "Music" has been selected with selector 910, musical genres are represented on selector 920. In FIG. 9A, the user has selected the "Classical" genre, and therefore the predefined sound profile for dynamic equalization for the "Classical" genre has been loaded. Five frequency bands are presented as vertical ranges 930. More frequency bands are possible. Each range is equipped with a slider 940 that begins at the value predefined for that range in "Classical" music. The user can manipulate any or all of these sliders up or down along their vertical ranges 930 to modify the sound presented. In field 950, the level of "Bass" begins where it is preset for "Classical" music, i.e., the "low" value, but the selector can be used to adjust the level of "Bass" to "High" or "Off." In another aspect, an additional field for "Bass sensation" that maps to haptic feedback can be presented. In FIG. 9B, the user has selected a different genre of Music, i.e., "Hip Hop." Accordingly, all of the dynamic equalization and Bass settings are the predefined values for the "Hip Hop" sound profile, and one can see that these are different than the values for "Classical." As in FIG. 9A, if the user wishes, the user can modify any or all of the settings in FIG. 9B. As one skilled in the art will appreciate, the controls of the interface presented in FIGS. 9A and 9B could be accomplished with alternative tools. Similarly, although similar subscreens have not been presented for each of the other aspects of tuning, similar subscreens with additional controls can be utilized for crossover gain, dynamic noise compression, time delays, and/or three-dimensional audio effects.

Figure 10:
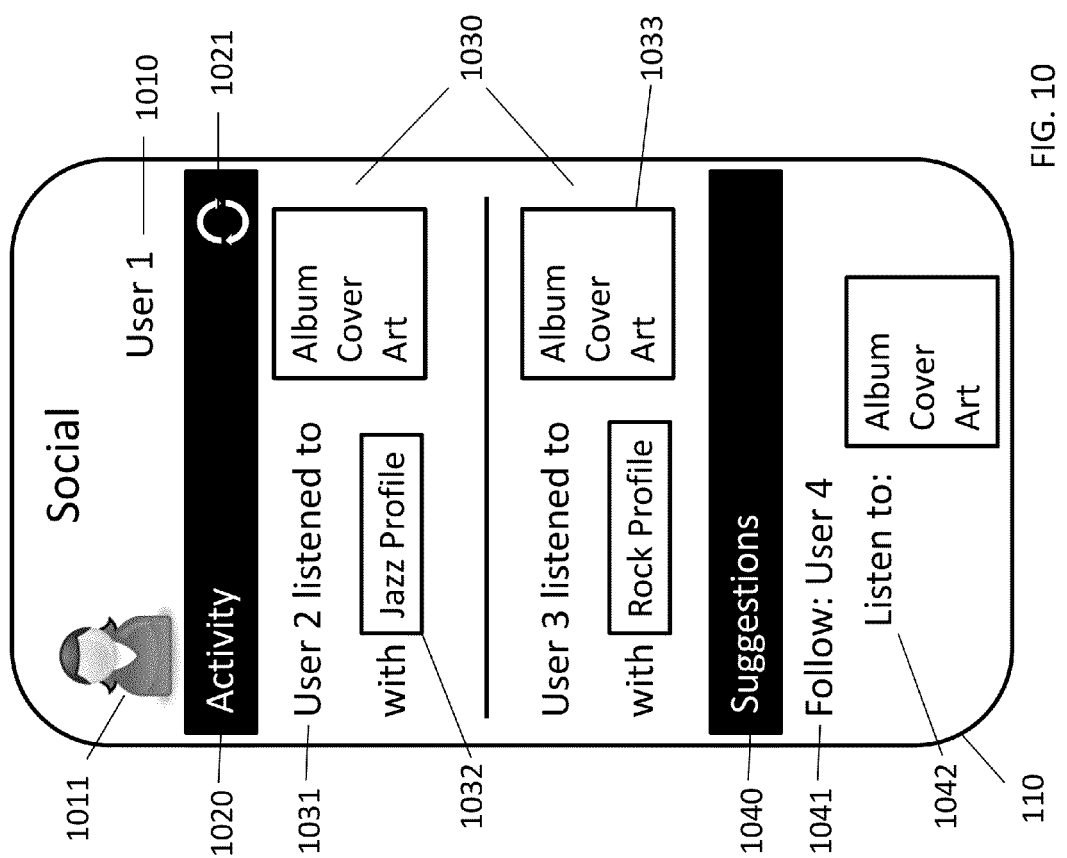
FIG. 10 shows an exemplary user interface by which the user can share the sound profile settings the user or the user's contacts have chosen.

FIG. 10 shows an exemplary user interface by which the user can share the sound profile settings the user or the user's contacts have chosen. User's identification is represented by some sort of user identification 1010, whether that is an actual name, a screen name, or some other kind of alias. The user can also be represented graphically, by some kind of picture or avatar 1011. The user interface in FIG. 10 contains an "Activity" region 1020 that can update periodically but which can be manually updated using a control such as refresh button 1021.

Within "Activity" region 1020, a number of events 1030 are displayed. Each event 1030 contains detail regarding the audio file experienced by another user 1031—again identified by some kind of moniker, picture, or avatar—and which sound profile 1032 was used to modify it. In FIG. 10, the audio file being listened to during each event 1030 is represented by an album cover 1033, but could be represented in other ways. The user interface allows the user to choose to experience the same audio file listened to by the other user 1031 by selecting it from activity region 1030. The user is then free to use the same sound profile 1032 as the other user 1031, or to decide for him or herself how the audio should be tuned according to the techniques described earlier herein.

In addition to following the particular audio events of certain other users in the "Activity" region 1020, the user interface depicted in FIG. 10 contains a "Suggestion" region 1040. Within "Suggestion" region 1040, the user interface is capable of making suggestions of additional users to follow, such as other user 1041, based on their personal connections to the user, their personal connection to those other users being followed by the user, or having similar audio tastes to the user based on their listening preferences or history 1042.

FIGS. 3 and 4 show systems capable of providing the user interface discuss in FIGS. 7-10.

Figure 11:
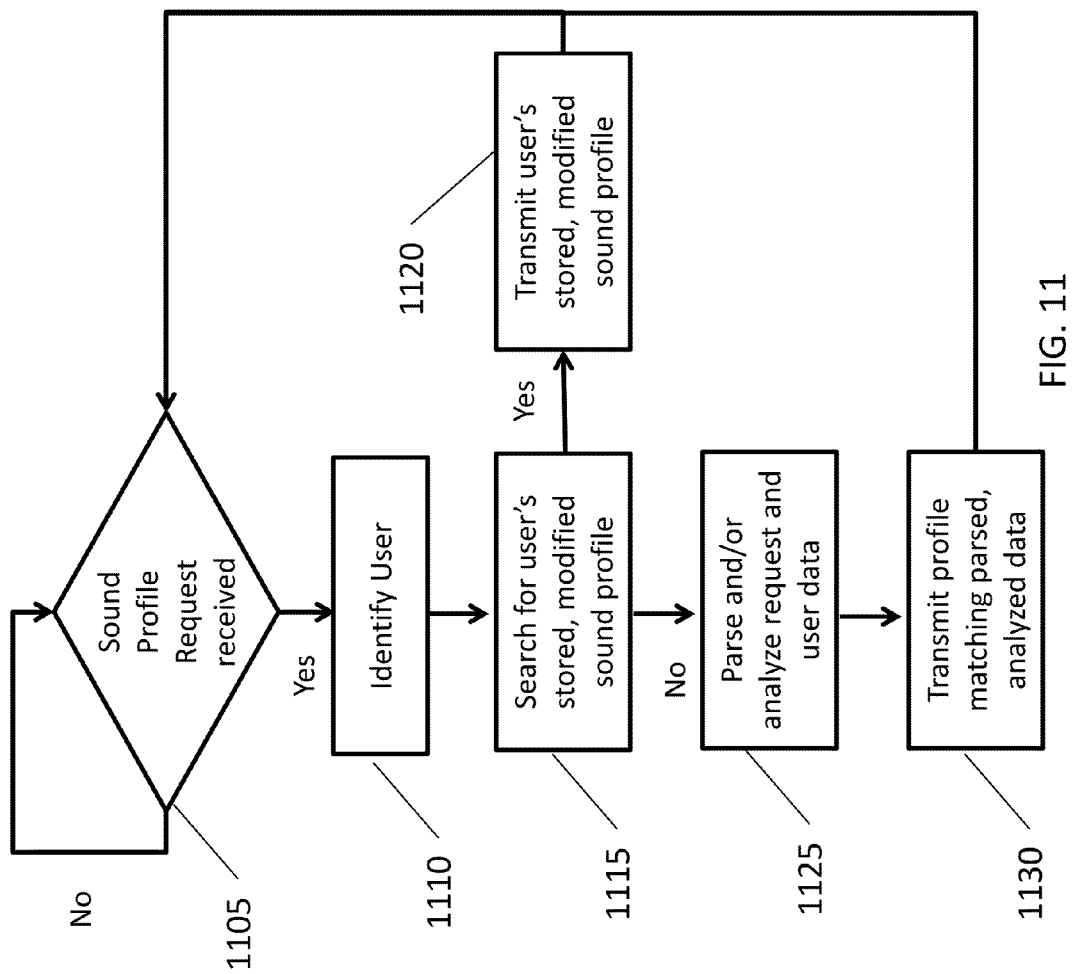
FIG. 11 shows steps undertaken by a computer with a sound profile database receiving a sound profile request.

FIG. 11 shows steps undertaken by a computer with a sound profile database receiving a sound profile request. The computer can be a local computer or stored in the cloud, on a server on a network, including the Internet. In particular, the database, which is connected to a network for communication, may receive a sound profile request (1105) from devices such as mobile device 110 referred to above. Such a request can provide device information and audio metadata identifying what kind of sound profile is being requested, and which user is requesting it. In another aspect, the request can contain an audio sample, which can be used to identify the metadata. Accordingly, the database is able to identify the user making the request (1110) and then search storage for any previously-modified sound profiles created and stored by the user that match the request (1115). If such a previously-modified profile matching the request exists in storage, the database is able to transmit it to the user over a network (1120). If no such previously-modified profile matching the request exists, the database works to analyze data included in the request to determine what preexisting sound profiles might be suitable (1125). For example, as discussed elsewhere herein, basic sound profiles could be archived in the database corresponding to different metadata such as genres of music, the artist, or song name. Similarly, the database could be loaded with sound profiles corresponding to specific reproduction devices or basic consumption modalities. The user may have identified his or her preferred geography, either as a predefined location or by way of the GPS receiver in the user's audio reproduction device. That information may allow for the modification of the generic genre profile in light of certain geographic reproduction preferences. Similar analysis and extrapolation may be conducted on the basis of demographic information, the specific consumption modality (e.g., indoors, outdoors, in a car, etc), reproduction devices, and so forth. As discussed in more detail below, if audio files are assigned certain intensity scores, sound profiles could be associated with intensity levels so that a user can make a request based on the intensity of music the user wishes to hear. As another example, the database may have a sound profile for a similar reproduction device, for the same song, created by someone on the same street, which suggests that sound profile would be a good match. The weighting of the different criteria in selecting a "best match" sound profile can vary. For example the reproduction device may carry greater weight than the geography. Once the data is analyzed and a suitable sound profile is identified and/or modified based on the data, the sound profile is transmitted over a network to the user (1130). Such a database could be maintained as part of a music streaming service, or other store that sells audio entertainment.

For example, the computer or set of computers could also maintaining a library of audio or media files for download or streaming by users. The audio and media files would have metadata, which could include intensity scores. When a user or recommendation engine selects media for download or streaming, the metadata for that media could be used to transmit a user's stored, modified sound profile (1120) or whatever preexisting sound profile might be suitable (1125). The computer can then transmit the sound profile with the media or transmit it or transmit it less frequency if the sound profile is suitable for multiple pieces of subsequent media (e.g. if a user selects a genre on a streaming station, the computer system may only need to send a sound profile for the first song of that genre, at least until the user switches genres).

Computer system 400 and computer system 1300 show systems capable of performing these steps. A subset of components in computer system 400 or computer system 1300 could also be used, and the components could be found in a PC, server, or cloud-based system. The steps described in FIG. 11 need not be performed in the order recited and two or more steps can be performed in parallel or combined.

Figure 12:
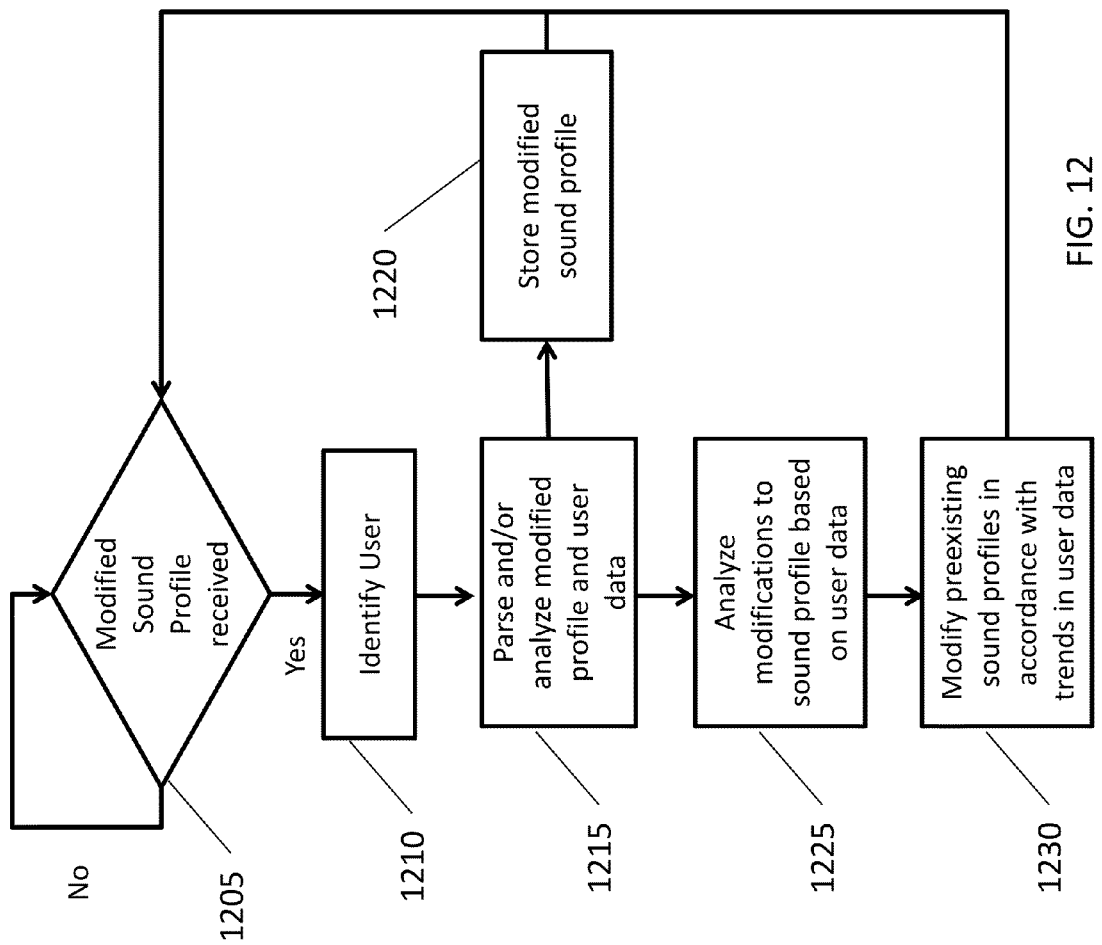
FIG. 12 shows steps undertaken by a computer with a sound profile database receiving a user-modified sound profile.

FIG. 12 shows steps undertaken by a computer with a sound profile database receiving a user-modified sound profile. In particular, once a user modifies an existing sound profile as previously described herein, the user's audio reproduction device can transmit the modified sound profile over a network back to the database at the first convenient opportunity. The modified sound profile is received at the database (1205), and can contain the modified sound profile information and information identifying the user, as well as any information entered by the user about himself/herself and information about the audio reproduction that resulted in the modifications. The database identifies the user of the modified sound profile (1210). Then the database analyzes the information accompanying the sound profile (1215). The database stores the modified sound profile for later use in response to requests from the user (1220). In addition, the database analyzes the user's modifications to the sound profile compared to the parsed/analyzed data (1225). If enough users modify a preexisting sound profile in a certain way, the preexisting default profile may be updated accordingly (1230). By way of example, if enough users from a certain geography consistently increase the level of bass in a preexisting sound profile for a certain genre of music, the preexisting sound profile for that geography may be updated to reflect an increased level of bass. In this way, the database can be responsive to trends among users, and enhance the sound profile performance over time. This is helpful, for example, if the database is being used to provide a streaming service, or other type of store where audio entertainment can be purchased. Similarly, if a user submits multiple sound profiles that have been modified in a similarly way (e.g. increasing the bass), the database can modify the default profiles when the same user makes requests for new sound profiles. After a first user has submitted a handful of modified profiles, the database can match the first user's changes to a second user in the database with more modified profiles and then use the second user's modified profiles when responding to future requests from the first user. The steps described in FIG. 12 need not be performed in the order recited and two or more steps can be performed in parallel or combined.

Figure 13:
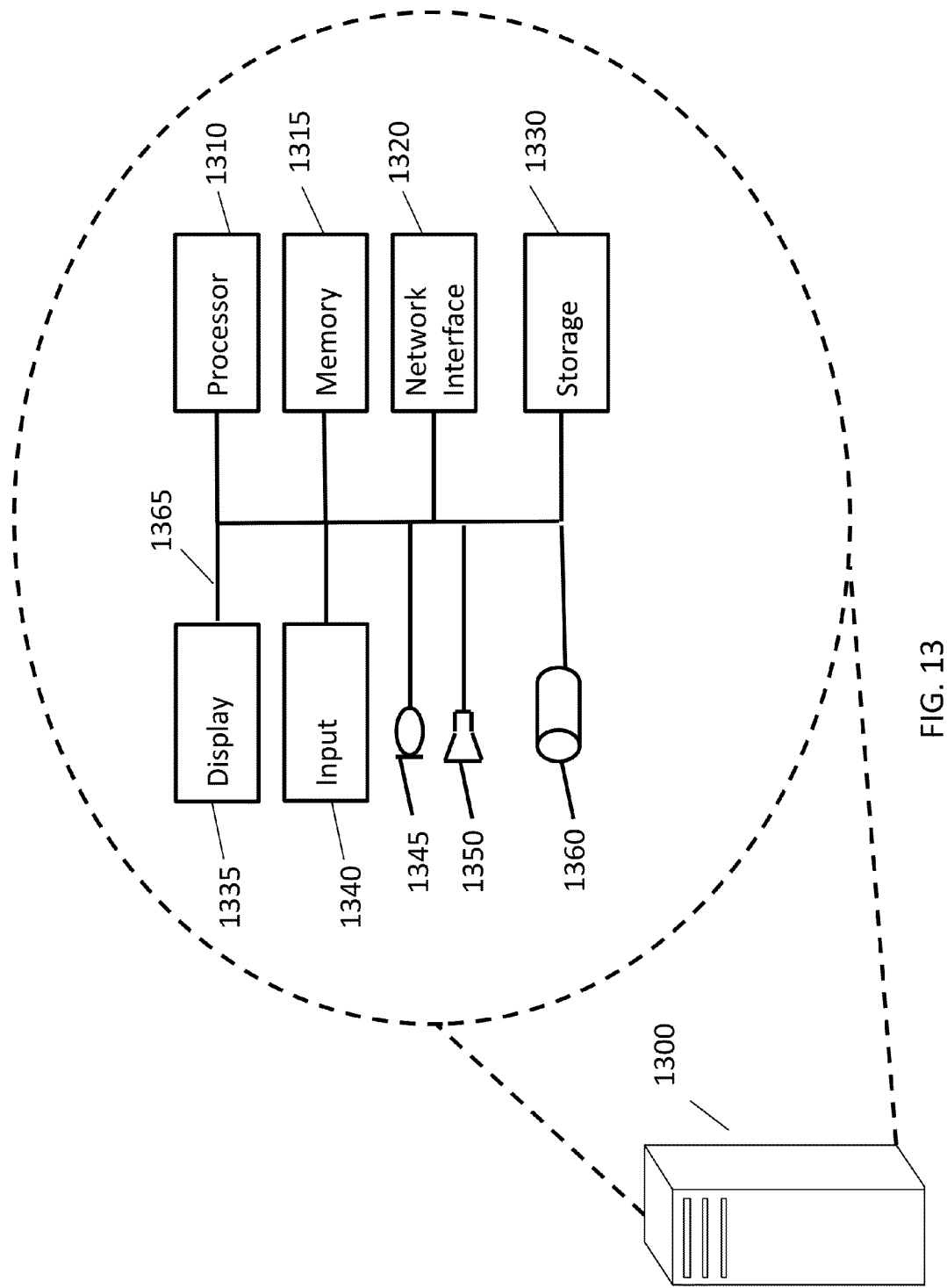
FIG. 13 shows a block diagram of a computer system capable of maintaining sound profile database and providing sound profiles to users.

FIG. 13 shows a block diagram of a computer system capable of performing the steps depicted in FIGS. 11 and 12. A subset of components in computer system 1300 could also be used, and the components could be found in a PC, server, or cloud-based system. Bus 1365 can include one or more physical connections and can permit unidirectional or omnidirectional communication between two or more of the components in the computer system 1300. Alternatively, components connected to bus 1365 can be connected to computer system 1300 through wireless technologies such as Bluetooth, Wifi, or cellular technology. The computer system 1300 can include a microphone 1345 for receiving sound and converting it to a digital audio signal. The microphone 1345 can be coupled to bus 1365, which can transfer the audio signal to one or more other components. Computer system 1300 can include a headphone jack 1360 for transmitting audio and data information to headphones and other audio devices.

An input 1340 including one or more input devices also can be configured to receive instructions and information. For example, in some implementations input 1340 can include a number of buttons. In some other implementations input 1340 can include one or more of a mouse, a keyboard, a touch pad, a touch screen, a joystick, a cable interface, voice recognition, and any other such input devices known in the art. Further, audio and image signals also can be received by the computer system 1300 through the input 1340.

Further, computer system 1300 can include network interface 1320. Network interface 1320 can be wired or wireless. A wireless network interface 1320 can include one or more radios for making one or more simultaneous communication connections (e.g., wireless, Bluetooth, low power Bluetooth, cellular systems, PCS systems, or satellite communications). A wired network interface 1320 can be implemented using an Ethernet adapter or other wired infrastructure.

Computer system 1300 includes a processor 1310. Processor 1310 can use memory 1315 to aid in the processing of various signals, e.g., by storing intermediate results. Memory 1315 can be volatile or non-volatile memory. Either or both of original and processed signals can be stored in memory 1315 for processing or stored in storage 1330 for persistent storage. Further, storage 1330 can be integrated or removable storage such as Secure Digital, Secure Digital High Capacity, Memory Stick, USB memory, compact flash, xD Picture Card, or a hard drive.

Image signals accessible in computer system 1300 can be presented on a display device 1335, which can be an LCD display, printer, projector, plasma display, or other display device. Display 1335 also can display one or more user interfaces such as an input interface. The audio signals available in computer system 1300 also can be presented through output 1350. Output device 1350 can be a speaker. Headphone jack 1360 can also be used to communicate digital or analog information, including audio and sound profiles.

In addition to being capable of performing virtually all of the same kinds of analysis, processing, parsing, editing, and playback tasks as computer system 400 described above, computer system 1300 is also capable of maintaining a database of users, either in storage 1330 or across additional networked storage devices. This type of database can be useful, for example, to operate a streaming service, or other type of store where audio entertainment can be purchased. Within the user database, each user is assigned some sort of unique identifier. Whether provided to computer system 1300 using input 1340 or by transmissions over network interface 1320, various data regarding each user can be associated with that user's identifier in the database, including demographic information, geographic information, and information regarding reproduction devices and consumption modalities. Processor 1310 is capable of analyzing such data associated with a given user and extrapolate from it the user's likely preferences when it comes to audio reproduction. For example, given a particular user's location and age, processor 1310 may be able to extrapolate that that user prefers a more bass-intensive experience. As another example, processor 1310 could recognize from device information that a particular reproduction device is meant for a transportation modality, and may therefore require bass supplementation, time delays, or other 3D audio effects. These user reproduction preferences can be stored in the database for later retrieval and use.

In addition to the user database, computer system 1300 is capable of maintaining a collection of sound profiles, either in storage 1330 or across additional networked storage devices. Some sound profiles may be generic, in the sense that they are not tied to particular, individual users, but may rather be associated with artists, albums, genres, games, movies, geographical regions, demographic groups, consumption modalities, device types, or specific devices. Other sound profiles may be associated with particular users, in that the users may have created or modified a sound profile and submitted it to computer system 1300 in accordance with the process described in FIG. 12. Such user-specific sound profiles not only contain the user's reproduction preferences but, by containing audio information and device information, they allow computer system 1300 to organize, maintain, analyze, and modify the sound profiles associated with a given user. For example, if a user modifies a certain sound profile while listening to a particular song in the user's car and submits that modified profile to computer system 1300, processor 1310 may recognize the changes user has made and decide which of those changes are attributable to the transportation modality versus which are more generally applicable. The user's other preexisting sound profiles can then be modified in ways particular to their modalities if different. Given a sufficient user population, then, trends in changing preferences will become apparent and processor 1310 can track such trends and use them to modify sound profiles more generally. For example, if a particular demographic group's reproduction preferences are changing according to a particular trend as they age, computer system 1300 can be sensitive to that trend and modify all the profiles associated with users in that demographic group accordingly.

In accordance with the process described in FIG. 11, users may request sound profiles from the collection maintained by computer system 1300, and when such requests are received over network interface 1320, processor 1310 is capable of performing the analysis and extrapolation necessary to determine the proper profile to return to the user in response to the request. If the user has changed consumption modalities since submitting a sound profile, for example, that change may be apparent in the device information associated with the user's request, and processor 1310 can either select a particular preexisting sound profile that suits that consumption modality, or adjust a preexisting sound profile to better suit that new modality. Similar examples are possible with users who use multiple reproduction devices, change genres, and so forth.

Given that computer system 1300 will be required to make selections among sound profiles in a multivariable system (e.g., artist, genre, consumption modality, demographic information, reproduction device), weighting tables may need to programmed into storage 1330 to allow processor 1310 to balance such factors. Again, such weighting tables can be modified over time if computer system 1300 detects that certain variables are predominating over others.

In addition to the user database and collection of sound profiles, computer system 1300 is also capable of maintaining libraries of audio content in its own storage 1330 and/or accessing other, networked libraries of audio content. In this way, computer system 1300 can be used not just to provide sound profiles in response to user requests, but also to provide the audio content itself that will be reproduced using those sound profiles as part of a streaming service, or other type of store where audio entertainment can be purchased. For example, in response to a user request to listen to a particular song in the user's car, computer system 1300 could select the appropriate sound profile, transmit it over network interface 1320 to the reproduction device in the car and then stream the requested song to the car for reproduction using the sound profile. Alternatively, the entire audio file representing the song could be sent for reproduction.

Figure 14:
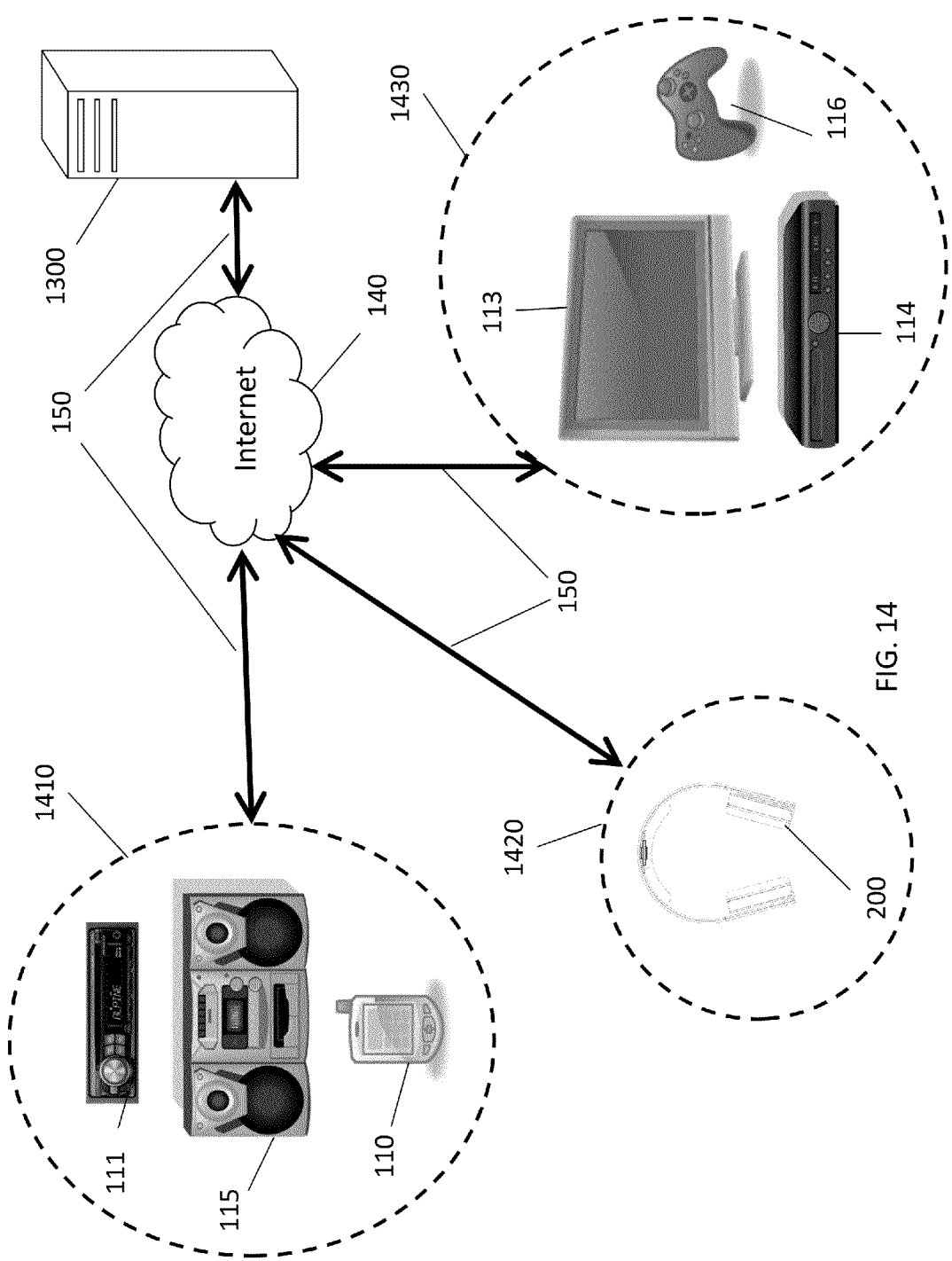
FIG. 14 shows how a computer system can provide sound profiles to multiple users.

FIG. 14 shows a diagram of how computer system 1300 can service multiple users from its user database. Computer system 1300 communicates over the Internet 140 using network connections 150 with each of the users denoted at 1410, 1420, and 1430. User 1410 uses three reproduction devices, head end 111, likely in a transportation modality, stereo 111, likely in an indoor modality, and portable media player 110, whose modality may change depending on its location. Accordingly, when user 1410 contacts computer system 1300 to make a sound profile request, the device information associated with that request may identify which of these reproduction devices is being used, where, and how to help inform computer system 1300's selection of a sound profile. User 1420 only has one reproduction device, headphones 200, and user 1430 has three devices, television 113, media player 114, and videogame system 116, but otherwise the process is identical.

Playback can be further enhanced by a deeper analysis of a user's music library. For example, In addition to more traditional audio selection metrics such as artist, genre, or the use of sonographic algorithms, intensity can be used as a criteria by which to select audio content. In this context, intensity refers to the blending of the low-frequency soundwave, amplitude, and wavelength. Using beats-per-minute and sound wave frequency, each file in a library of audio files can be assigned an intensity score, e.g., from 1 to 4, with Level 1 being the lowest intensity level and Level 4 being the highest. When all or a subset of these audio files are loaded onto a reproduction device, that device can detect the files (1505) and determine their intensity, sorthing them based on their intensity level in the process (1510). The user then need only input his or her desired intensity level and the reproduction device can create a customized playlist of files based on the user's intensity selection (1520). For example, if the user has just returned home from a hard day of work, the user may desire low-intensity files and select Level 1. Alternatively, the user may be preparing to exercise, in which case the user may select Level 4. If the user desires, the intensity selection can be accomplished by the device itself, e.g., by recognizing the geographic location and making an extrapolation of the desired intensity at that location. By way of example, if the user is at the gym, the device can recognize that location and automatically extrapolate that Level 4 will be desired. The user can provide feedback while listening to the intensity-selected playlist and the system can use such feedback to adjust the user's intensity level selection and the resulting playlist (1530). Finally, the user's intensity settings, as well as the iterative feedback and resulting playlists can be returned to the computer system for further analysis (1540).

By analyzing user's responses to the selected playlists, better intensity scores can be assigned to each file, better correlations between each of the variables (BPM, soundwave frequency) and intensity can be developed, and better prediction patterns of which files users will enjoy at a given intensity level can be constructed.

Figure 15:
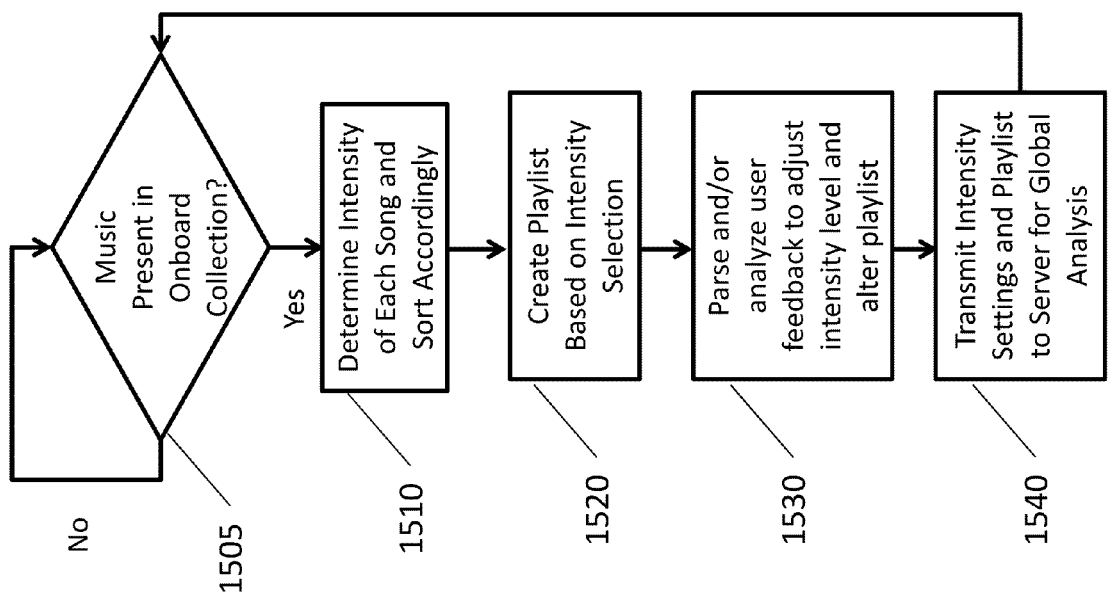
FIG. 15 shows steps undertaken by a computer to analyze a user's music collection to allow for intensity-based content selection.

The steps described in FIG. 15 need not be performed in the order recited and two or more steps can be performed in parallel or combined. The steps of FIG. 15 can be accomplished by a user's reproduction device, such as those with the capabilities depicted in FIGS. 3 and 4. Alternatively, the steps in FIG. 15 could be performed in the cloud or on a server on the Internet by a device with the capabilities of those depicted in FIG. 13 as part of a streaming service or other type of store where audio entertainment can be purchased. The intensity analysis could be done for each song and stored with corresponding metadata for each song. The information could be provided to a user when it requests one or more sound profiles to save power on the device and create a more consistent intensity analysis. In another aspect, an intensity score calculated by a device could be uploaded with a modified sound profile and the sound profile database could store that intensity score and provide it to other users requesting sound profiles for the same song.

Figure 16B:
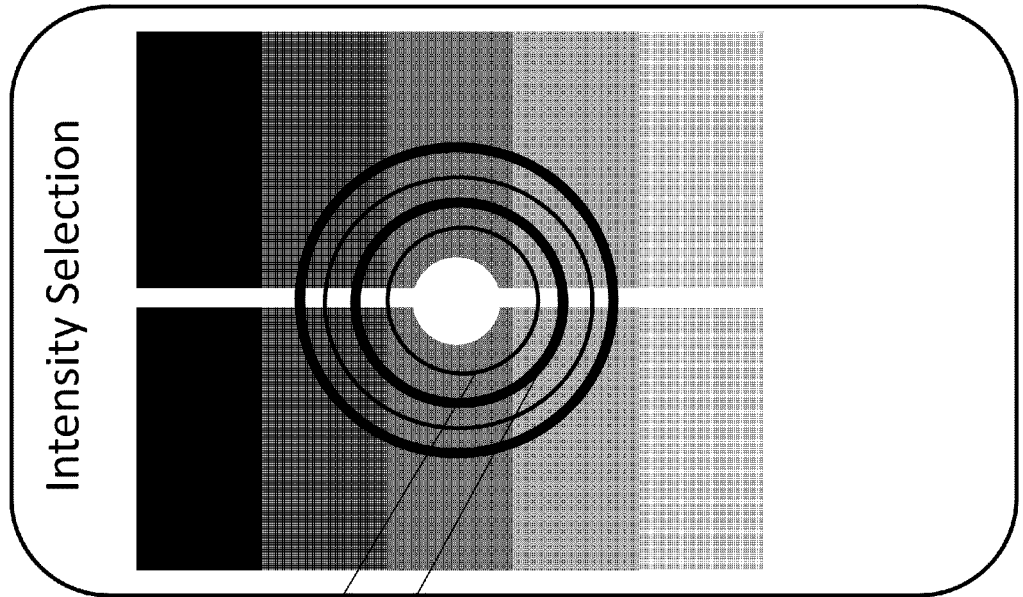
FIGS. 16A-B show an exemplary user interface by which the user can perform intensity-based content selection.
Figure 16A:
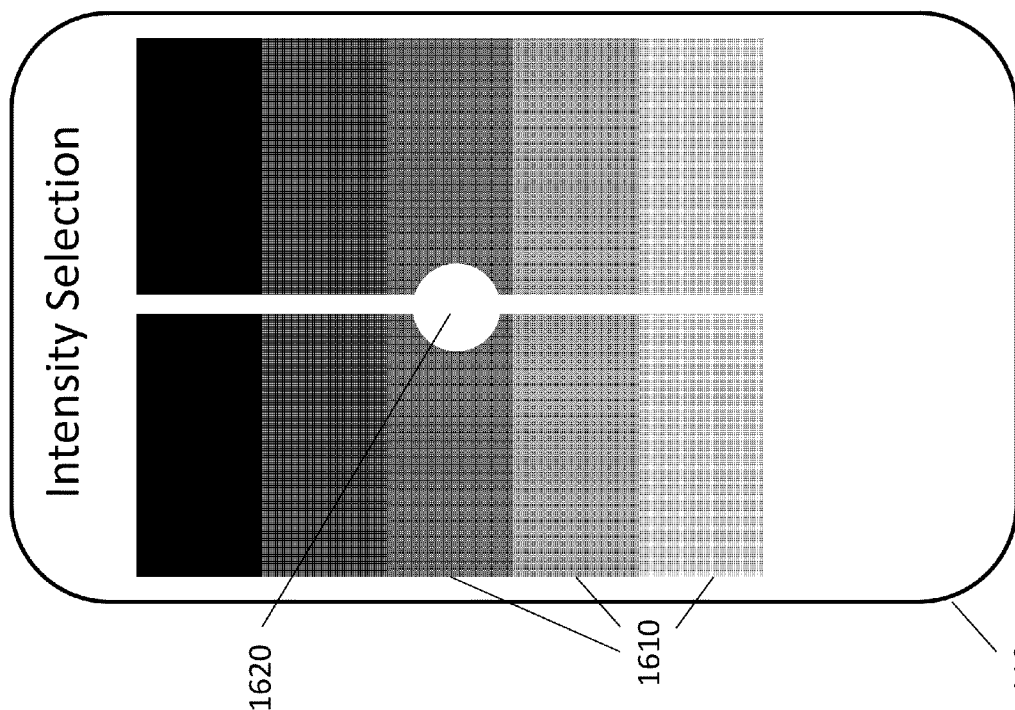

FIGS. 16A-B show an exemplary user interface by which the user can perform intensity-based content selection on a reproduction device such as mobile device 110. In FIG. 16A, the various intensity levels are represented by color gradations 1610. By moving slider 1620 up or down, the user can select an intensity level based on the color representations. Metadata such as artist and song titles can be layered on top of visual elements 1610 to provide specific examples of songs that match the selected intensity score. In FIG. 16B, haptic interpretations have been added as concentric circles 1630 and 1640. By varying the spacing, line weight, and/or oscillation frequency of these circles, a visual throbbing effect can be depicted to represent changes in the haptic response at the different intensity levels so the user can select the appropriate, desired level. As one skilled in the art will appreciate, the controls of the interface presented in FIGS. 16A and 16B could be accomplished with alternative tools. FIGS. 3 and 4 show systems capable of providing the user interface depicted in FIGS. 16A-B.

A number of examples of implementations have been disclosed herein. Other implementations are possible based on what is disclosed and illustrated.

What is claimed is:

1. A device for reproducing enhanced media content, the media content including audio data, comprising:
   a memory component capable of storing media content, wherein the media content includes audio data and audio metadata related to the audio data in the media content;
   a transmitter component capable of transmitting information about the device for reproducing enhanced media content and audio metadata related to the audio data over a network, wherein the information about the device comprises information related to the consumption modality;
   a receiver component capable of receiving a sound profile over the network, wherein the sound profile is capable of containing preselected parameters for modifying the audio data and an intensity score, wherein one or more preselected parameters in the sound profile are matched to one or more pieces of information in the audio metadata related to the audio data in the media content and the information related to the consumption modality; and a processor component capable of accessing the stored media content including the audio data from the memory component and the information about the device for reproducing enhanced media content, causing the transmitter component to transmit the information about the device for reproducing enhanced media content and the audio metadata related to the audio data in the media content over the network, accessing the sound profile received by the receiver component, and modifying the audio data in the media content according to the preselected parameters in the received sound profile.

2. The device of claim 1, further comprising a user interface capable of allowing a user to change the preselected parameters contained within the received sound profile to create a changed sound profile.

3. The device of claim 2, wherein the memory component is capable of storing the changed sound profile.

4. The device of claim 3, wherein the transmitter component is capable of transmitting the changed sound profile.

5. The device of claim 1, wherein the transmitter component is capable of transmitting an initial request for a set of sound profiles, wherein the receiver component is further configured to receive a set of sound profiles for a variety of genres, and wherein the processor component is further capable of selecting a sound profile matched to the genre of the audio data before applying the sound profile.

6. The device of claim 1, wherein the intensity score relates to one of: beats-per-minute or sound wave frequency of the audio data in the media content.

7. The device of claim 1, wherein the information about the device for reproducing enhanced media content comprises demographic information of a user and one or more of the preselected parameters in the sound profile are matched to the demographic information.

8. The device of claim 1, wherein the media content is an MP3 file.

9. The device of claim 8, further comprising an amplifier component capable of amplifying the modified audio data.

10. The device of claim 1, wherein the sound profile comprises information for three or more channels.

11. A device for reproducing enhanced media content, the media content including audio data, comprising:
a memory component capable of storing media content, wherein the media content includes audio data and audio metadata related to the audio data in the media content;
a transmitter component capable of transmitting information about the device for reproducing enhanced media content and audio metadata related to the audio data over a network;
a receiver component capable of receiving a sound profile over the network, wherein the received sound profile is capable of containing preselected parameters for modifying the audio data and an intensity score, wherein one or more of the preselected parameters in the received sound profile are matched to one or more pieces of information in the audio metadata related to the audio data in the media content; and
a processor component capable of accessing the stored media content including the audio data from the memory component and the information about the device for reproducing enhanced media content, causing the transmitter component to transmit the information about the device for reproducing enhanced media content and the audio metadata related to the audio data in the media content over the network, accessing the received sound profile received by the receiver component, and modifying the audio data in the media content according to the preselected parameters in the received sound profile.

12. The device of claim 11, further comprising a user interface capable of allowing a user to change one or more of the parameters contained within the received sound profile to create a modified sound profile.

13. The device of claim 12, wherein the audio metadata related to the audio data in the media content comprises a genre of audio data, the memory component is further capable of storing the modified sound profile and the genre of the audio data, and the processor component is capable of applying the modified sound profile to the audio data of a second piece of media content having the same genre.

14. The system of claim 12, wherein the transmitter component is further capable of transmitting the modified sound profile.

15. The device of claim 11, wherein the received sound profile was created by the same user on a different device.

16. The device of claim 11, wherein the received sound profile is a modified sound profile that was modified using a sound profile created by the same user on a different device and was modified to match characteristics of the device for reproducing enhanced media content.

17. The device of claim 11, further comprising a pair of headphones connected to the device and capable of reproducing the modified audio data.

18. The system of claim 11, wherein the transmitter component is further capable of transmitting the modified audio data to a speaker capable of reproducing the modified audio data.

* * * * *